United States Patent
Irie et al.

(10) Patent No.: US 12,031,032 B2
(45) Date of Patent: Jul. 9, 2024

(54) THERMOPLASTIC RESIN INCLUDING A FLAME RETARDANT AND ORGANOPOLYSILOXANE

(71) Applicants: Mitsubishi Engineering-Plastics Corporation, Minato-ku (JP); Mitsubishi Chemical Corporation, Chiyoda-ku (JP)

(72) Inventors: Yasuyuki Irie, Hiratsuka (JP); Satoshi Mochida, Hiratsuka (JP); Takumi Watanabe, Chiyoda-ku (JP); Noriaki Terada, Chiyoda-ku (JP)

(73) Assignees: Mitsubishi Engineering-Plastics Corporation, Minato-ku (JP); Mitsubishi Chemical Corporation, Chiyoda (JP)

( * ) Notice: Subject to any disclaimer, the term of this patent is extended or adjusted under 35 U.S.C. 154(b) by 186 days.

(21) Appl. No.: 17/256,467

(22) PCT Filed: Jul. 8, 2019

(86) PCT No.: PCT/JP2019/026984
§ 371 (c)(1),
(2) Date: Dec. 28, 2020

(87) PCT Pub. No.: WO2020/013127
PCT Pub. Date: Jan. 16, 2020

(65) Prior Publication Data
US 2021/0238420 A1 Aug. 5, 2021

(30) Foreign Application Priority Data

Jul. 11, 2018 (JP) .................................. 2018-131702
Mar. 28, 2019 (JP) .................................. 2019-063942

(51) Int. Cl.
| | |
|---|---|
| *C08L 69/00* | (2006.01) |
| *C08K 5/42* | (2006.01) |
| *C08L 9/00* | (2006.01) |
| *C08L 27/12* | (2006.01) |
| *C08L 33/08* | (2006.01) |
| *C08L 83/04* | (2006.01) |
| *C08G 77/00* | (2006.01) |
| *C08G 77/16* | (2006.01) |
| *C08G 77/18* | (2006.01) |

(52) U.S. Cl.
CPC ................ *C08L 83/04* (2013.01); *C08K 5/42* (2013.01); *C08L 9/00* (2013.01); *C08L 27/12* (2013.01); *C08L 33/08* (2013.01); *C08L 69/00* (2013.01); *C08G 77/16* (2013.01); *C08G 77/18* (2013.01); *C08G 77/80* (2013.01); *C08L 2207/04* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 4,265,801 A | 5/1981 | Moody et al. | |
| 5,100,958 A | 3/1992 | Fuhr et al. | |
| 6,184,312 B1 | 2/2001 | Yamamoto et al. | |
| 8,828,642 B2 * | 9/2014 | Kamogawa | C08K 3/36 430/290 |
| 9,909,005 B2 | 3/2018 | Yamada et al. | |
| 2001/0018487 A1 | 8/2001 | Itagaki et al. | |
| 2003/0199631 A1 | 10/2003 | Itagaki et al. | |
| 2008/0125527 A1 * | 5/2008 | Tsuneishi | C08L 25/04 524/261 |
| 2012/0289625 A1 | 11/2012 | Matsuno et al. | |
| 2014/0058025 A1 | 2/2014 | Meyer et al. | |
| 2017/0183478 A1 | 1/2017 | Van Nuffel et al. | |
| 2017/0058114 A1 | 3/2017 | Arrigoni et al. | |
| 2017/0081512 A1 | 3/2017 | Wen | |
| 2018/0355177 A1 | 12/2018 | Yamada et al. | |

FOREIGN PATENT DOCUMENTS

| | | |
|---|---|---|
| EP | 0 829 521 A1 | 3/1998 |
| JP | 1-318069 A | 12/1989 |
| JP | 62-60421 B2 | 12/1997 |
| JP | 10-139964 A | 5/1998 |
| JP | 11-222559 A | 8/1999 |
| JP | 2000-212459 A | 8/2000 |
| JP | 2000-226527 A | 8/2000 |
| JP | 2001-26704 A | 1/2001 |
| JP | 2001-311081 A | 11/2001 |
| JP | 2001311081 | * 11/2001 |
| JP | 2003-253109 A | 9/2003 |
| JP | 2003-253110 A | 9/2003 |
| JP | 2005-232442 A | 9/2005 |
| JP | 2009-40876 A | 2/2009 |
| JP | 2011-256303 A | 12/2011 |
| JP | 2017-507233 A | 3/2017 |

(Continued)

OTHER PUBLICATIONS

International Search Report issued on Oct. 8, 2019 in PCT/JP2019/026984 filed on Jul. 8, 2019, 2 pages.

(Continued)

*Primary Examiner* — David J Buttner

(74) *Attorney, Agent, or Firm* — Oblon, McClelland, Maier & Neustadt, L.L.P.

(57) ABSTRACT

A thermoplastic resin composition, may include a thermoplastic resin (A) and, per 100 parts by mass of the thermoplastic resin (A), from 0 to 0.2 parts by mass of a metal salt-containing flame retardant (B), and not less than 0.05 parts by mass and less than 3 parts by mass of an organopolysiloxane (C), wherein the organopolysiloxane (C) has a molecular weight distribution (Mw/Mn) in a range of from 1.01 to 1.4.

17 Claims, 1 Drawing Sheet

(56) References Cited

FOREIGN PATENT DOCUMENTS

| JP | 2017-526797 A | 9/2017 |
| JP | 2018-16756 A | 2/2018 |
| JP | 2000-327897 A | 11/2020 |
| WO | WO 2016/203916 A1 | 12/2016 |

OTHER PUBLICATIONS

Japanese Office Action Issued Feb. 2, 2021 In Japanese Patent Application No. 2020-077253 (with unedited computer generated English translation), 10 pages.
Extended European Search Report issued Mar. 23, 2022 in European Patent Application No. 19833722.2, 5 pages.

* cited by examiner

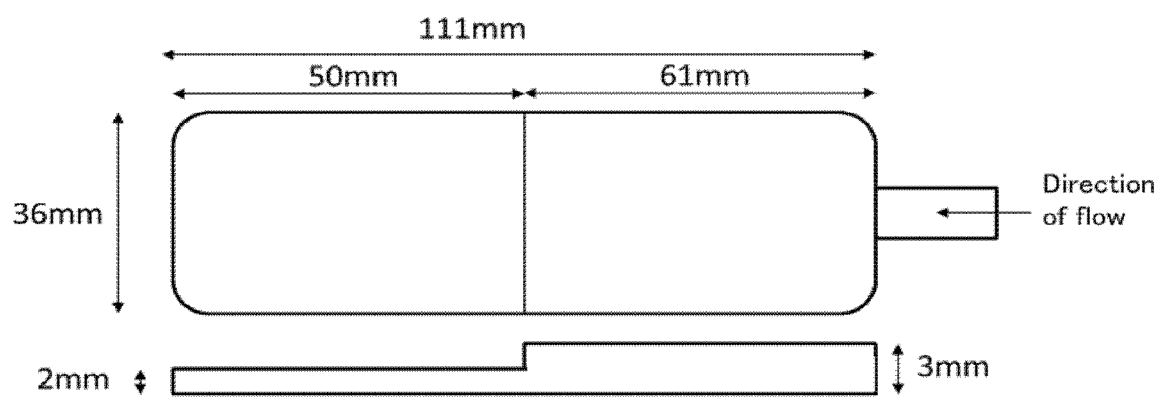

THERMOPLASTIC RESIN INCLUDING A FLAME RETARDANT AND ORGANOPOLYSILOXANE

TECHNICAL FIELD

The present invention relates to a thermoplastic resin composition and a molded article including same, and more specifically relates to a thermoplastic resin composition which exhibits excellent flame retardancy and excellent residence moldability when molded without compromising excellent mechanical characteristics of a thermoplastic resin, such as impact resistance, and a molded article including same.

BACKGROUND ART

As resins that exhibit excellent mechanical strength, heat resistance, transparency, and the like, thermoplastic resins such as polycarbonate resins are widely used in fields such as components of electrical/electronic/office automation equipment, motor vehicle components, construction materials, medical applications and miscellaneous goods.

In these applications, high flame retardancy is required for reasons of safety.

In the past, products obtained by blending brominated flame retardants and phosphorus flame retardants in polycarbonate resins were known as flame retardant polycarbonate resin compositions.

However, polycarbonate resin compositions that contain brominated flame retardants tend to exhibit lower thermal stability and tend to cause corrosion of screws and molding dies of molding machines when such compositions are molded. In addition, polycarbonate resin compositions that contain phosphorus flame retardants inhibit high transparency, which is a characteristic of polycarbonate resins, and tend to exhibit lower impact resistance and heat resistance, and are therefore restricted in terms of applications.

Conversely, organopolysiloxanes exhibit high heat resistance, are unlikely to generate harmful gases when combusted, and exhibit high inherent safety, and many tests have therefore been carried out in order to use organopolysiloxanes as flame retardants (see PTL 1 to 3).

However, adding these organopolysiloxanes in isolation very rarely leads to a high flame retardancy effect, and even if a relatively high effect is confirmed, a large quantity of organopolysiloxane needs to be added in order to satisfy strict flame retardancy criteria relating to electronic devices, meaning that moldability, kneadability and other characteristics required of plastics are adversely affected, and there are also disadvantages in terms of cost, meaning that organopolysiloxanes were not viable.

Conversely, as a method for improving the flame retardancy effect of organopolysiloxanes, PTL 4 discloses a method involving the use of a combination of an organopolysiloxane and a metal salt of an organic sulfonic acid. In this method, however, retention at the time of molding caused thermal degradation and the like and led to the problem of appearance defects such as silvering occurring on the surface of molded articles.

CITATION LIST

Patent Literature

[PTL 1] JP S62-60421-B
[PTL 2] JP H01-318069-A
[PTL 3] JP H10-139964-A
[PTL 4] JP 2001-26704-A

SUMMARY OF INVENTION

Technical Problem

The present invention has been devised with the above-mentioned problem in mind, and has the purpose of providing a thermoplastic resin composition that exhibits excellent flame retardancy and excellent residence moldability when molded without compromising excellent mechanical characteristics of a thermoplastic resin, such as impact resistance.

Solution to Problem

As a result of repeated diligent research carried out in order to develop a superior thermoplastic resin composition such as that mentioned above, the inventors of the present invention found that the problem mentioned above could be solved by a thermoplastic resin composition additionally containing a specific amount of an organopolysiloxane having a specific molecular weight distribution, and thereby attained the present invention.

The present invention relates to the following thermoplastic resin composition, and a molded article thereof.

[1] A thermoplastic resin composition, comprising a thermoplastic resin (A) and, per 100 parts by mass of the thermoplastic resin (A), from 0 to 0.2 parts by mass of a metal salt-containing flame retardant (B), and not less than 0.05 parts by mass and less than 3 parts by mass of an organopolysiloxane (C), wherein the organopolysiloxane (C) has a molecular weight distribution (Mw/Mn) of 1.01 to 1.4.

[2] The thermoplastic resin composition of [1] above, comprising, per 100 parts by mass of the thermoplastic resin (A), from 0.01 to 0.2 parts by mass of the metal salt-containing flame retardant (B), and not less than 0.05 parts by mass and less than 3 parts by mass of the organopolysiloxane (C), the organopolysiloxane (C) having a molecular weight distribution (Mw/Mn) of 1.01 to 1.4.

[3] The thermoplastic resin composition of [1] or [2] above, wherein the thermoplastic resin (A) is a polycarbonate resin.

[4] The thermoplastic resin composition of any one of [1] to [3] above, wherein the metal salt-containing flame retardant (B) is an alkali metal salt of an organic sulfonic acid.

[5] The thermoplastic resin composition of [4] above, wherein the alkali metal salt of the organic sulfonic acid is an alkali metal salt of a perfluoroalkane sulfonic acid.

[6] The thermoplastic resin composition of [5] above, wherein the alkali metal salt of the perfluoroalkane sulfonic acid is a potassium nonafluorobutane sulfonate and/or a potassium trifluoromethane sulfonate.

[7] The thermoplastic resin composition of any one of [1] to [6] above, wherein a main chain of the organopolysiloxane (C) has a branched structure.

[8] The thermoplastic resin composition of any one of [1] to [7] above, wherein the organopolysiloxane (C) satisfies the following formula (1) and 0≤D/(T+Q)≤0.4, $$(R^1R^2R^3SiO_{1/2})_M(R^4R^5SiO_{2/2})_D(R^6SiO_{3/2})_T(SiO_{4/2})_Q \\ (O_{1/2}R^7)_{E1}(O_{1/2}H)_{E2} \quad (1),$$

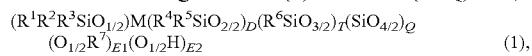

wherein $R^1$ to $R^6$ are each independently selected from among an organic functional group and a hydrogen atom; $R^7$ is an organic group; M, D, T and Q are each a number that is not less than 0 and less than 1 and satisfies M+D+T+Q=1; and E1≥0, E2≥0, and 0<E1+E2≤4.

[9] The thermoplastic resin composition of any one of [1] to [8] above, wherein the organopolysiloxane (C) contains an organooxy group in a quantity of 0.01 to 10 mol % relative to the total amount of organic functional groups.

[10] The thermoplastic resin composition of any one of [1] to [9] above, wherein the organopolysiloxane (C) contains the organooxy group in a quantity of 0.01 to 5 mol % relative to the total amount of organic functional groups.

[11] The thermoplastic resin composition of any one of [1] to [10] above, wherein the organopolysiloxane (C) satisfies the formula (1) and 0.3≤M≤0.6.

[12] The thermoplastic resin composition of any one of [1] to [11] above, wherein a weight average molecular weight of the organopolysiloxane (C) is from 500 to 2,000.

[13] The thermoplastic resin composition of any one of [1] to [12] above, wherein the organopolysiloxane (C) satisfies the formula (1) and D=0.

[14] The thermoplastic resin composition of any one of [1] to [13] above, further containing a fluorinated resin.

[15] The thermoplastic resin composition of any one of [1] to [14] above, further containing a light-diffusing agent.

[16] The thermoplastic resin composition of [15] above, wherein the light-diffusing agent is at least one type of a spherical particle selected from among a methylsilsesquioxane and an acrylic resin.

[17] The thermoplastic resin composition of any one of [1] to [16] above, further containing an elastomer.

[18] The thermoplastic resin composition of [17] above, wherein the elastomer is a core/shell type elastomer including a butadienic rubber as a core and a content of the elastomer is from 0.5 to 5 parts by mass per 100 parts by mass of the thermoplastic resin (A).

[19] A molded article, comprising the thermoplastic resin composition of any one of [1] to [18] above.

Advantageous Effects of Invention

The thermoplastic resin composition of the present invention exhibits excellent flame retardancy and excellent residence moldability when molded without compromising excellent mechanical characteristics of a thermoplastic resin, such as impact resistance.

BRIEF DESCRIPTION OF DRAWINGS

FIG. 1 shows the shape of a two-step plate used for evaluating residence moldability in Examples.

DESCRIPTION OF EMBODIMENTS

The present invention will now be explained in greater detail through the use of embodiments and exemplifications, but it should be understood that the present invention is not limited to the embodiments and illustrations given below.

Moreover, in cases where the symbol "–" is used in the present specification to indicate a range that encompasses numerical values or physical property values before and after the "–", the range includes the values before and after the "–".

The thermoplastic resin composition of the present invention comprising a thermoplastic resin (A) and, per 100 parts by mass of the thermoplastic resin (A), from 0 to 0.2 parts by mass of a metal salt-containing flame retardant (B), and not less than 0.05 parts by mass and less than 3 parts by mass of an organopolysiloxane (C), wherein the organopolysiloxane (C) has a molecular weight distribution (Mw/Mn) of 1.01 to 1.4.

[(A) Thermoplastic Resin]

The thermoplastic resin (A) used in the present invention is not particularly limited, and examples thereof include a polycarbonate resin, a polystyrene resin, a high impact polystyrene resin, a polyalkyl methacrylate resin, a polyphenyl ether resin, a polyester resin such as a polybutylene terephthalate resin, a polyacetal resin and a polyamide resin. It is possible to use one of these in isolation or a combination of two or more types thereof.

Of these, a polycarbonate resin is particularly preferred.

[Polycarbonate Resin]

The type of polycarbonate resin is not limited.

A polycarbonate resin is a polymer having a carbonate bond-containing basic structure represented by the general formula: —[—O—X—O—C(=O)—]—. Moreover, in the formula, the X moiety generally denotes a hydrocarbon group, but it is possible to use X moieties into which heteroatoms or heterobonds have been introduced in order to impart a variety of characteristics.

In addition, polycarbonate resins can be classified into aromatic polycarbonate resins, in which a carbon atom directly bonded to a carbonate bond is an aromatic carbon atom, and aliphatic polycarbonate resins, in which a carbon atom directly bonded to a carbonate bond is an aliphatic carbon atom. Of these, aromatic polycarbonate resins are preferred from perspectives such as heat resistance, mechanical properties and electrical properties.

These are not limited to specific types of polycarbonate resin, but examples thereof include polycarbonate polymers obtained by reacting a dihydroxy compound with a carbonate precursor. On such occasion, it is possible to react a polyhydroxy compound or the like in addition to a dihydroxy compound and carbonate precursor. In addition, it is also possible to use a method in which a cyclic ether is reacted with carbon dioxide as a carbonate precursor. In addition, the polycarbonate polymer may be a straight chain or branched chain polymer. Furthermore, the polycarbonate polymer may be a homopolymer including one type of repeating unit or a copolymer having two or more types of repeating unit. Here, copolymers may be selected from among a variety of copolymer forms, such as random copolymers and block copolymers. Moreover, such polycarbonate polymers are generally thermoplastic resins.

Among monomers that serve as raw materials for aromatic polycarbonate resins, examples of aromatic dihydroxy compounds include:
dihydroxybenzene compounds such as 1,2-dihydroxybenzene, 1,3-dihydroxybenzene (that is, resorcinol) and 1,4-dihydroxybenzene;
dihydroxybiphenyl compounds such as 2,5-dihydroxybiphenyl, 2,2'-dihydroxybiphenyl and 4,4'-dihydroxybiphenyl;

dihydroxynaphthalene compounds such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene and 2,7-dihydroxynaphthalene;

dihydroxydiaryl ether compounds such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene and 1,3-bis(4-hydroxyphenoxy)benzene;

bis(hydroxyaryl)alkanes such as
2,2-bis(4-hydroxyphenyl)propane (that is, bisphenol A),
1,1-bis(4-hydroxyphenyl)propane,
2,2-bis(3-methyl-4-hydroxyphenyl)propane,
2,2-bis(3-methoxy-4-hydroxyphenyl)propane,
2-(4-hydroxyphenyl)-2-(3-methoxy-4-hydroxyphenyl)propane,
1,1-bis(3-tert-butyl-4-hydroxyphenyl)propane,
2,2-bis(3,5-dimethyl-4-hydroxyphenyl)propane,
2,2-bis(3-cyclohexyl-4-hydroxyphenyl)propane,
2-(4-hydroxyphenyl)-2-(3-cyclohexyl-4-hydroxyphenyl)propane,
α,α'-bis(4-hydroxyphenyl)-1,4-diisopropylbenzene,
1,3-bis[2-(4-hydroxyphenyl)-2-propyl]benzene,
bis(4-hydroxyphenyl)methane,
bis(4-hydroxyphenyl)cyclohexylmethane,
bis(4-hydroxyphenyl)phenylmethane,
bis(4-hydroxyphenyl) (4-propenylphenyl)methane,
bis(4-hydroxyphenyl)diphenylmethane,
bis(4-hydroxyphenyl)naphthylmethane,
1,1-bis(4-hydroxyphenyl)ethane,
1,1-bis(4-hydroxyphenyl)-1-phenylethane,
1,1-bis(4-hydroxyphenyl)-1-naphthylethane,
1,1-bis(4-hydroxyphenyl)butane,
2,2-bis(4-hydroxyphenyl)butane,
2,2-bis(4-hydroxyphenyl)pentane,
1,1-bis(4-hydroxyphenyl)hexane,
2,2-bis(4-hydroxyphenyl)hexane,
1,1-bis(4-hydroxyphenyl)octane,
2,2-bis(4-hydroxyphenyl)octane,
1,1-bis(4-hydroxyphenyl)hexane,
2,2-bis(4-hydroxyphenyl)hexane,
4,4-bis(4-hydroxyphenyl)heptane,
2,2-bis(4-hydroxyphenyl)nonane,
1,1-bis(4-hydroxyphenyl)decane, and
1,1-bis(4-hydroxyphenyl)dodecane;

bis(hydroxyaryl)cycloalkanes such as
1,1-bis(4-hydroxyphenyl)cyclopentane,
1,1-bis(4-hydroxyphenyl)cyclohexane,
1,1-bis(4-hydroxyphenyl)-3,3-dimethylcyclohexane,
1,1-bis(4-hydroxyphenyl)-3,4-dimethylcyclohexane,
1,1-bis(4-hydroxyphenyl)-3,5-dimethylcyclohexane,
1,1-bis(4-hydroxyphenyl)-3,3,5-trimethylcyclohexane,
1,1-bis(4-hydroxy-3,5-dimethylphenyl)-3,3,5-trimethylcyclohexane,
1,1-bis(4-hydroxyphenyl)-3-propyl-5-methylcyclohexane,
1,1-bis(4-hydroxyphenyl)-3-tert-butyl-cyclohexane,
1,1-bis(4-hydroxyphenyl)-3-phenylcyclohexane, and
1,1-bis(4-hydroxyphenyl)-4-phenylcyclohexane;

cardo structure-containing bisphenol compounds such as
9,9-bis(4-hydroxyphenyl)fluorene and
9,9-bis(4-hydroxy-3-methylphenyl)fluorene;

dihydroxydiaryl sulfide compounds such as
4,4'-dihydroxydiphenyl sulfide and
4,4'-dihydroxy-3,3'-dimethyldiphenyl sulfide;

dihydroxydiaryl sulfoxide compounds such as
4,4'-dihydroxydiphenyl sulfoxide,
4,4'-dihydroxy-3,3'-dimethyldiphenyl sulfoxide; and dihydroxydiaryl sulfone compounds such as
4,4'-dihydroxydiphenyl sulfone and
4,4'-dihydroxy-3,3'-dimethyldiphenyl sulfone.

Of these, bis(hydroxyaryl)alkane compounds are preferred, and of these, bis(4-hydroxyphenyl)alkane compounds are preferred and 2,2-bis(4-hydroxyphenyl)propane (that is, bisphenol A) is particularly preferred from the perspectives of impact resistance and heat resistance.

Moreover, the aromatic dihydroxy compound may be a single type or a combination of two or more arbitrary types thereof combined at arbitrary proportions. In addition, the polycarbonate resin may also be a copolymer including mainly a polycarbonate resin, such as a copolymer of a polycarbonate and a polymer or oligomer having a siloxane structure.

In addition, examples of monomers that serve as raw materials for aliphatic polycarbonate resins include:

alkane diol compounds such as ethane-1,2-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol and decane-1,10-diol;

cycloalkane diol compounds such as cyclopentane-1,2-diol, cyclohexane-1,2-diol, cyclohexane-1,4-diol, 1,4-cyclohexanedimethanol, 4-(2-hydroxyethyl)cyclohexanol and 2,2,4,4-tetramethyl-cyclobutane-1,3-diol;

glycol compounds such as ethylene glycol, 2,2'-oxydiethanol (that is, diethylene glycol), triethylene glycol, propylene glycol and spiroglycol;

aralkyl diol compounds such as 1,2-benzenedimethanol, 1,3-benzenedimethanol, 1,4-benzenedimethanol, 1,4-benzenediethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyldimethanol, 4,4'-biphenyldiethanol, 1,4-bis(2-hydroxyethoxy)biphenyl, bisphenol A bis(2-hydroxyethyl) ether and bisphenol S bis(2-hydroxyethyl) ether; and cyclic ether compounds such as 1,2-epoxyethane (that is, ethylene oxide), 1,2-epoxypropane (that is, propylene oxide), 1,2-epoxycyclopentane, 1,2-epoxycyclohexane, 1,4-epoxycyclohexane, 1-methyl-1,2-epoxycyclohexane, 2,3-epoxynorbornane and 1,3-epoxypropane.

Among monomers that serve as raw materials for aromatic polycarbonate resins, examples of polycarbonate precursors include carbonyl halides and carbonate esters. Moreover, the carbonate precursor may be a single type or a combination of two or more arbitrary types thereof combined at arbitrary proportions.

Specific examples of carbonyl halides include phosgene; and haloformates such as bischloroformates of dihydroxy compounds and monochloroformates of dihydroxy compounds.

Specific examples of carbonate esters include diaryl carbonate compounds such as diphenyl carbonate and ditolyl carbonate; dialkyl carbonate compounds such as dimethyl carbonate and diethyl carbonate; and carbonates of dihydroxy compounds, such as biscarbonates of dihydroxy compounds, monocarbonates of dihydroxy compounds and cyclic carbonates.

<Method for Producing Polycarbonate Resin>

The method for producing the polycarbonate resin is not particularly limited, and an arbitrary method can be used. Examples thereof include interfacial polymerization methods, melt transesterification methods, the pyridine process, ring opening polymerization of cyclic carbonate compounds, and solid phase transesterification of prepolymers. A detailed explanation will now be given of the most suitable of these methods.

<Interfacial Polymerization Method>

First, an explanation will be given of a case in which the polycarbonate resin is produced using an interfacial polymerization method.

In an interfacial polymerization method, a polycarbonate resin is obtained by reacting a dihydroxy compound with a carbonate precursor (preferably phosgene) in the presence of an organic solvent that is inert in the reaction and an aqueous alkaline solution while maintaining a pH of 9 or more, and then carrying out interfacial polymerization in the presence of a polymerization catalyst. Moreover, a molecular weight-adjusting agent (a chain terminator) may, if necessary, be present in the reaction system, and an antioxidant may be present in the reaction system in order to prevent oxidation of the dihydroxy compound.

The dihydroxy compound and carbonate-forming compound that serve as raw materials of the polycarbonate resin are as described above. Moreover, among carbonate-forming compounds, phosgene is preferably used, and a method in which phosgene is used is known as the phosgene method.

Examples of organic solvents that are inert in the reaction include chlorinated hydrocarbons such as dichloromethane, 1,2-dichloroethane, chloroform, monochlorobenzene and dichlorobenzene; and aromatic hydrocarbons such as benzene, toluene and xylene. Moreover, the organic solvent may be a single type or a combination of two or more arbitrary types thereof combined at arbitrary proportions.

Examples of alkaline compounds contained in the aqueous alkaline solution include alkali metal compounds or alkaline earth metal compounds such as sodium hydroxide, potassium hydroxide, lithium hydroxide and sodium hydrogen carbonate, but of these, sodium hydroxide and potassium hydroxide are preferred. Moreover, the alkaline compound may be a single type or a combination of two or more arbitrary types thereof combined at arbitrary proportions.

The concentration of the alkaline compound in the aqueous alkaline solution is not limited, but in general, a concentration of 5 to 10 mass % is used in order to control the pH of the aqueous alkaline solution within the range 10 to 12 during the reaction. In addition, in cases where phosgene is blown into the reaction system, it is generally preferable for the molar ratio of the dihydroxy compound and the alkaline compound to be 1:1.9 or more, and especially 1:2.0 or more, and 1:3.2 or less, and especially 1:2.5 or less in order to control the pH of the aqueous phase within the range 10 to 12, and preferably within the range 10 to 11.

Examples of the polymerization catalyst include aliphatic tertiary amines such as trimethylamine, triethylamine, tributylamine, tripropylamine and trihexylamine; alicyclic tertiary amines such as N,N'-dimethylcyclohexylamine and N,N'-diethylcyclohexylamine; aromatic tertiary amines such as N,N'-dimethylaniline and N,N'-diethylaniline; quaternary ammonium salts such as trimethylbenzyl ammonium chloride, tetramethyl ammonium chloride and triethylbenzyl ammonium chloride; pyridine; guanine; guanidine salts, and the like. Moreover, the polymerization catalyst may be a single type or a combination of two or more arbitrary types thereof combined at arbitrary proportions.

Examples of molecular weight regulators include aromatic phenol compounds having monohydric phenolic hydroxyl groups; aliphatic alcohols such as methanol and butanol; mercaptans; and phthalimide, but of these, aromatic phenol compounds are preferred. Specific examples of such aromatic phenol compounds include alkyl group-substituted phenol compounds such as m-methylphenol, p-methylphenol, m-propylphenol, p-propylphenol, p-tert-butylphenol and p-long chain alkyl-substituted phenol compounds; vinyl group-containing phenol compounds such as isopropanylphenol; epoxy group-containing phenol compounds; and carboxyl group-containing phenol compounds such as 0-oxybenzoic acid and 2-methyl-6-hydroxyphenyl acetic acid. Moreover, the molecular weight regulator may be a single type or a combination of two or more arbitrary types thereof combined at arbitrary proportions.

The usage quantity of the molecular weight regulator is generally 0.5 moles or more, and preferably 1 mole or more, and generally 50 moles or less, and preferably 30 moles or less, relative to 100 moles of the dihydroxy compound that is a raw material. By setting the usage quantity of the molecular weight-adjusting agent to fall within this range, it is possible to improve the thermal stability and resistance to hydrolysis when the obtained polycarbonate resin is used in the polycarbonate resin composition.

When carrying out the polymerization reaction, the order in which the reactants (raw materials), reaction solvent, catalyst, additives, and the like, are blended is not limited as long as the desired polycarbonate resin can be obtained, and an appropriate order should be set arbitrarily. For example, in cases where phosgene is used as a carbonate-forming compound, the molecular weight regulator can be blended at any point between the reaction between the dihydroxy compound and the phosgene (a phosgenation reaction) and the start of the polymerization reaction.

Moreover, the reaction temperature is generally 0° C. to 40° C., and the reaction time is generally between several minutes (for example, 10 minutes) and several hours (for example, 6 hours).

<Melt Transesterification Method>

An explanation will now be given of a case in which the polycarbonate resin is produced using a melt transesterification method.

In a melt transesterification method, a transesterification reaction is carried out between, for example, a carbonic acid diester and a dihydroxy compound.

Compounds mentioned above are used as the dihydroxy compound and the carbonate ester, but among the carbonate esters used, diphenyl carbonate and substituted diphenyl carbonates are preferred, and diphenyl carbonate is more preferred. Moreover, the carbonate ester may be a single type or a combination of two or more arbitrary types thereof combined at arbitrary proportions.

The proportions of the dihydroxy compound and the carbonate ester are not limited as long as the desired polycarbonate resin can be obtained, but it is preferable to use the carbonate ester at an equimolar quantity or more relative to 1 mole of the dihydroxy compound, and especially in a quantity of 1.01 moles or more relative to 1 mole of the dihydroxy compound. Moreover, the upper limit of this proportion is generally 1.30 moles or less. By setting these proportions to fall within this range, the quantity of terminal hydroxyl groups can be adjusted within an appropriate range.

In polycarbonate resins, the quantity of terminal hydroxyl groups tends to have a major effect on thermal stability, resistance to hydrolysis, color tone, and the like. Therefore, the quantity of terminal hydroxyl groups may be adjusted if necessary using any publicly known method. In transesterification reactions, it is generally possible to obtain a polycarbonate resin having the desired quantity of terminal hydroxyl groups by, for example, adjusting the blending proportions of the carbonate ester and the dihydroxy compound or by adjusting the degree of pressure reduction during the transesterification reaction. Moreover, by carrying out such operations, it is generally possible to adjust the molecular weight of the obtained polycarbonate resin.

In cases where the quantity of terminal hydroxyl groups is adjusted by adjusting the blending proportions of the carbonate ester and the dihydroxy compound, the blending proportions should be as mentioned above.

In addition, an example of a more proactive adjustment method is a method in which a chain terminator is separately blended during the reaction. In such cases, examples of chain terminators able to be used include monohydric phenol compounds, monohydric carboxylic acids and carbonate esters. Moreover, the chain terminator may be a single type or a combination of two or more arbitrary types thereof combined at arbitrary proportions.

When producing a polycarbonate resin by a melt transesterification method, a transesterification catalyst is generally used. Any transesterification catalyst can be used. Of these, the use of, for example, an alkali metal compound and/or an alkaline earth metal compound is preferred. In addition, it is possible to supplementally use a basic compound such as a basic boron compound, a basic phosphorus compound, a basic ammonium compound or an amine compound. Moreover, the transesterification catalyst may be a single type or a combination of two or more arbitrary types thereof combined at arbitrary proportions.

In melt transesterification methods, the reaction temperature is generally 100° C. to 320° C. In addition, the pressure during the reaction is generally a reduced pressure of 2 mmHg or less. A specific procedure is to carry out a melt polycondensation reaction under the temperature and pressure ranges mentioned above while removing by-products such as aromatic hydroxy compounds.

The melt polycondensation reaction can be carried out using a batch type method or a continuous method. When carrying out a batch type reaction, the order in which the reactants (raw materials), reaction solvent, catalyst, additives, and the like are blended is not limited as long as the desired polycarbonate resin can be obtained, and an appropriate order should be set arbitrarily. However, from perspectives such as stability of the polycarbonate resin and the resin composition, it is preferable for the melt polycondensation reaction to be carried out using a continuous process.

In the melt transesterification method, a catalyst deactivator may be used if necessary. Any compound that neutralizes the transesterification catalyst can be used as a catalyst deactivator. Examples thereof include sulfur-containing acidic compounds and derivatives thereof. Moreover, the catalyst deactivator may be a single type or a combination of two or more arbitrary types thereof combined at arbitrary proportions.

The usage quantity of the catalyst deactivator is generally 0.5 equivalents or more, and preferably 1 equivalent or more, and generally 10 equivalents or less, and preferably 5 equivalents or less, relative to the alkali metal or alkaline earth metal contained in the transesterification catalyst. Furthermore, the usage quantity of the catalyst deactivator is generally 1 ppm or more and generally 100 ppm or less, and preferably 50 ppm or less, relative to the polycarbonate resin.

The polycarbonate resin preferably contains a certain proportion or more of a polycarbonate resin whose structural viscosity index N falls within a prescribed range.

The structural viscosity index N is an indicator for evaluating the flow properties of a molten substance. In general, the melt characteristics of polycarbonate resins can be expressed by the formula: $\gamma = a \cdot \sigma^N$.

In the formula, $\gamma$ denotes shear rate, a denotes a constant, $\sigma$ denotes stress, and N denotes the structural viscosity index.

In the numerical formula above, Newtonian fluidity is exhibited when N=1, and non-Newtonian fluidity increases as the value of N increases. That is to say, flow characteristics of a molten substance are evaluated using the magnitude of the structural viscosity index N. In general, a polycarbonate resin having a high structural viscosity index N tends to have a higher melt viscosity in a low shear region. Therefore, in cases where a polycarbonate resin having a high structural viscosity index N is mixed with another polycarbonate resin, it is possible to suppress dripping when an obtained thermoplastic resin composition is combusted and improve flame retardancy.

It is preferable to incorporate a certain proportion or more of a polycarbonate resin for which the structural viscosity index N is 1.2 or more, preferably 1.25 or more, and more preferably 1.28 or more, and is 1.8 or less, and preferably 1.7 or less. By incorporating this type of polycarbonate resin having a high structural viscosity index N, it is easy to suppress dripping when the thermoplastic resin composition of the present invention is combusted and improve flame retardancy. In addition, by setting the structural viscosity index N to be no higher than the upper limit of the range mentioned above, moldability of the thermoplastic resin composition of the present invention can be maintained within a favorable range.

Moreover, the structural viscosity index N can be expressed by $\log \eta_a = [(1-N)/N] \times \log \gamma + C$, which is derived from the formula above, as disclosed in Japanese Patent Application Publication No. 2005-232442 A for example. In the formula above, N denotes the structural viscosity index, $\gamma$ denotes shear rate, C denotes a constant, and $\eta_a$ denotes apparent viscosity. As can be understood from this formula, the value of N can be evaluated from $\gamma$ and $\eta_a$ in low shear regions having significantly different viscosity behaviors. For example, the value of N can be determined from $\eta_a$ when $\gamma=12.16$ sec$^{-1}$ and $\gamma=24.32$ sec$^{-1}$.

In cases where the polycarbonate resin used in the thermoplastic resin composition of the present invention contains the polycarbonate resin mentioned above having a structural viscosity index N of 1.2 or more, the content thereof is preferably 20 mass % or more of the polycarbonate resin. By constituting in this way, the characteristic synergistic effect achieved by the polycarbonate resin having this type of specific structural unit and the metal salt-containing flame retardant (B) can be exhibited to a remarkable degree. In cases where a polycarbonate resin having a structural viscosity index N of 1.2 or more is contained, the content thereof is more preferably 30 mass % or more, and further preferably 50 mass % or more, of the polycarbonate resin. Moreover, the upper limit thereof is generally 100 mass % or less, but is preferably 90 mass % or less, and more preferably 85 mass % or less.

The polycarbonate resin mentioned above having a structural viscosity index N of 1.2 or more can be produced in accordance with the method described above for producing the polycarbonate resin, but it is preferable to constitute in such a way as to produce a polycarbonate resin having a branched structure (hereinafter referred to as a "branched polycarbonate resin" as appropriate) from the perspective of ease of obtaining a polycarbonate resin having a structural viscosity index N of 1.2 or more. This is because branched polycarbonate resins tend to have a higher structural viscosity index N.

Examples of methods for producing branched polycarbonate resins include methods disclosed in Japanese Patent Application Publication No. H 08-259687 and Japanese Patent Application Publication No. H 08-245782. In the methods disclosed in these documents, it is possible to obtain an aromatic polycarbonate resin having a high structural viscosity index and excellent stability to hydrolysis without using a branching agent by selecting catalyst conditions and production conditions when reacting a dihydroxy compound and a carbonic acid diester using a melt transesterification method.

In addition, an example of another method for producing a branched polycarbonate resin is a method including using a trifunctional or higher polyfunctional compound (a branching agent) in addition to a dihydroxy compound and a carbonate-forming compound that are raw materials of the polycarbonate resin mentioned above, and copolymerizing these using an interfacial polymerization method or a melt transesterification method.

Examples of trifunctional or higher polyfunctional compounds include polyhydroxy compounds such as 1,3,5-trihydroxybenzene (phloroglucin), 4,6-dimethyl-2,4,6-tri(4-hydroxyphenyl)heptene-2, 4,6-dimethyl-2,4,6-tri(4-hydroxyphenyl)heptane, 2,6-dimethyl-2,4,6-tri(4-hydroxyphenyl)heptene-3, 1,3,5-tri(4-hydroxyphenyl)benzene and 1,1,1-tri(4-hydroxyphenyl)ethane; 3,3-bis(4-hydroxyaryl)oxyindole (that is, isatinbisphenol), 5-chloroisatin, 5,7-dichloroisatin and 5-bromoisatin. Of these, 1,1,1-tri(4-hydroxyphenyl)ethane is preferred.

The polyfunctional compound can be used as a replacement for a part of the dihydroxy compound. Relative to the entire amount of a dihydroxy compound raw material, the usage quantity of a polyfunctional aromatic compound is generally 0.01 mol % or more, and preferably 0.1 mol % or more, and is generally 10 mol % or less, and preferably 3 mol % or less. Moreover, the polyfunctional compound may be a single type or a combination of two or more arbitrary types thereof combined at arbitrary proportions.

Among the methods mentioned above as methods for producing branched polycarbonate resins, the method mentioned above for producing a branched polycarbonate resin using a melt transesterification method is particularly preferred. This is because a branched polycarbonate resin can be produced relatively inexpensively from raw materials that can be easily procured on an industrial scale. Therefore, the polycarbonate resin is preferably produced using a melt transesterification method.

Moreover, a polycarbonate resin having a structural viscosity index N of 1.2 or more may be a single resin in isolation or a combination of two or more arbitrary types thereof combined at arbitrary proportions.

<Other Matters Relating to the Polycarbonate Resin>

The molecular weight of the polycarbonate resin used in the thermoplastic resin composition of the present invention is arbitrary and should be selected and decided as appropriate, but the viscosity average molecular weight [Mv], which is calculated from solution viscosity, is generally 10,000 or more, preferably 14,000 or more, and more preferably 16,000 or more, and is generally 40,000 or less, and preferably 30,000 or less. By setting the viscosity average molecular weight to be no lower than the lower limit of the range mentioned above, it is possible to further improve the mechanical strength of the thermoplastic resin composition of the present invention, and this viscosity average molecular weight is more preferred in cases where the thermoplastic resin composition is to be used in applications requiring high mechanical strength. Meanwhile, by setting the viscosity average molecular weight to be no higher than the upper limit of the range mentioned above, it is possible to better suppress a reduction in the fluidity of the thermoplastic resin composition of the present invention, increase molding processing properties, and facilitate molding.

Moreover, it is possible to use a mixture of two or more types of polycarbonate resin having different viscosity average molecular weights, and in such cases, it is possible to mix polycarbonate resins whose viscosity average molecular weights fall outside the preferred range mentioned above.

The polycarbonate resin preferably contains a high molecular weight polycarbonate resin, for example a polycarbonate resin having a viscosity average molecular weight [Mv] of preferably 50,000 to 95,000. The viscosity average molecular weight of the high molecular weight polycarbonate resin is more preferably 55,000 or more, further preferably 60,000 or more, and within this range is preferably 61,000 or more and especially 62,000 or more, and is more preferably 90,000 or less, further preferably 85,000 or less, and within this range is preferably 80,000 or less, especially 75,000 or less, and 70,000 or less in particular.

In cases where a high molecular weight polycarbonate resin is contained, the content thereof is preferably 5 mass % or more, more preferably 10 mass % or more, and further preferably 15 mass % or more, of the polycarbonate resin. Moreover, the upper limit of this content is preferably 40 mass % or less, and more preferably 30 mass % or less.

Moreover, the viscosity average molecular weight [Mv] is a value obtained by determining the intrinsic viscosity [η](units: dl/g) at 20° C. using a Ubbelohde type viscometer using methylene chloride as a solvent, and then calculating the viscosity average molecular weight from the Schnell viscosity equation, that is, $\eta=1.23\times10^{-4}\,Mv^{0.83}$. In addition, the intrinsic viscosity [η] is a value obtained by measuring the specific viscosity [$\eta_{sp}$] at a number of solution concentrations [C] (g/dl) and calculating the intrinsic viscosity from the following expression.

$$\eta = \lim_{c \to 0} \eta_{sp}/c \qquad [\text{Math. 1}]$$

The terminal hydroxyl group concentration in the polycarbonate resin is arbitrary and should be selected and decided as appropriate, but is generally 1,000 ppm or less, preferably 1,500 ppm or less, and more preferably 1,000 ppm or less. By constituting in this way, it is possible to further improve the residence thermal stability and color tone of the thermoplastic resin composition of the present invention. In addition, the lower limit of this concentration is generally 10 ppm or more, preferably 30 ppm or more, and more preferably 40 ppm or more, for a polycarbonate resin produced using a melt transesterification method in particular. Due to this configuration, it is possible to suppress a decrease in molecular weight and further improve the mechanical characteristics of the thermoplastic resin composition of the present invention.

Moreover, units for terminal hydroxyl group concentration are such that the mass of terminal hydroxyl groups is expressed in terms of ppm relative to the mass of the polycarbonate resin. This measurement method is a colorimetric method involving use of a titanium tetrachloride/acetic acid method (this is described in Macromol. Chem. 88 215 (1965)).

In addition, in order to improve the appearance of a molded article or improve the fluidity, the polycarbonate resin may contain a polycarbonate oligomer. The viscosity average molecular weight [Mv] of this polycarbonate oligomer is generally 1,500 or more, and preferably 2,000 or more, and is generally 9,500 or less, and preferably 9,000 or less. Furthermore, it is preferable for the contained polycarbonate oligomer to account for 30% by mass or less of the polycarbonate resin (including the polycarbonate oligomer).

[(B) Metal Salt-Containing Flame Retardant]

The thermoplastic resin composition of the present invention preferably contains a metal salt-containing flame retardant (B). By incorporating the metal salt-containing flame retardant (B), it is possible to facilitate formation of a carbide layer when the thermoplastic resin composition of the present invention is combusted and further increase flame retardancy, and it is also possible to favorably maintain mechanical properties such as impact resistance and properties such as heat resistance and electrical characteristics, which are inherent in the thermoplastic resin (A).

The metal salt-containing flame retardant (B) is preferably an organic metal salt-containing flame retardant, and especially an organic alkali metal salt compound. Examples of organic metal salt-containing flame retardants include metal salts of sulfonic acids, metal salts of carboxylic acids, metal salts of boric acids and metal salts of phosphoric acids, but metal salts of organic sulfonic acids are preferred from the perspective of thermal stability.

Examples of alkali metals in alkali metal salts include lithium (Li), sodium (Na), potassium (K), rubidium (Rb) and cesium (Cs), but of these, sodium, potassium and cesium are most preferred.

Examples of preferred alkali metal salts of organic sulfonic acids include alkali metal salts of fluorinated aliphatic sulfonic acids and aromatic sulfonic acids. Preferred specific examples of these include alkali metal salts of fluorinated aliphatic sulfonic acids having at least one C—F bond in the molecule, such as potassium perfluorobutane sulfonate, lithium perfluorobutane sulfonate, sodium perfluorobutane sulfonate, cesium perfluorobutane sulfonate, potassium trifluoromethane sulfonate, lithium trifluoromethane sulfonate, sodium trifluoromethane sulfonate and cesium trifluoromethane sulfonate; and alkali metal salts of aromatic sulfonic acids having at least one type of aromatic group in the molecule, such as dipotassium diphenylsulfone-3,3'-disulfonate, potassium diphenylsulfone-3-sulfonate, sodium benzene sulfonate, sodium (poly)styrene sulfonate, sodium para-toluene sulfonate, sodium (branched) dodecylbenzene sulfonate, sodium trichlorobenzene sulfonate, potassium benzene sulfonate, potassium styrene sulfonate, potassium (poly)styrene sulfonate, potassium para-toluene sulfonate, potassium (branched) dodecylbenzene sulfonate, potassium trichlorobenzene sulfonate, cesium benzene sulfonate, cesium (poly)styrene sulfonate, cesium para-toluene sulfonate, cesium (branched) dodecylbenzene sulfonate and cesium trichlorobenzene sulfonate.

Of the examples given above, alkali metal salts of fluorinated aliphatic sulfonic acids are particularly preferred, alkali metal salts of perfluoroalkane sulfonic acids are more preferred, and potassium perfluorobutane sulfonate and sodium trifluoromethane sulfonate in particular are especially preferred.

The metal salt-containing flame retardant (B) may be a single compound or an arbitrary combination of two or more different compounds combined at arbitrary proportions.

The content of the metal salt-containing flame retardant (B) in the thermoplastic resin composition of the present invention is preferably 0.01 to 0.2 parts by mass relative to 100 parts by mass of the thermoplastic resin (A). This content is preferably 0.02 parts by mass or more, more preferably 0.03 parts by mass or more, and further preferably 0.04 parts by mass or more, and is preferably 0.75 parts by mass or less, more preferably 0.5 parts by mass or less, and particularly preferably 0.3 parts by mass or less. A thermoplastic resin composition obtained by incorporating the metal salt-containing flame retardant (B) exhibits high flame retardancy, and by incorporating this flame retardant within the preferred range mentioned above, it is possible to achieve even higher flame retardancy. Conversely, if the content of the flame retardant is too high, the thermal stability and hydrolysis resistance of the thermoplastic resin tend to deteriorate, and appearance defects and reduced mechanical strength may occur in a molded article.

[(C) Organopolysiloxane]

The thermoplastic resin composition of the present invention contains the organopolysiloxane (C), which has a molecular weight distribution (Mw/Mn) of 1.01 to 1.4. The term organopolysiloxane means a polymeric substance in which an organic group is added to a structure having a portion in which a silicon atom is bonded to another silicon atom via oxygen. An organopolysiloxane generally means an organic polymer having siloxane bonds as a main chain, and examples thereof include compounds represented by general compositional formula (1) below and mixtures thereof. Formula (1):

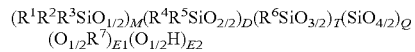

In formula (1) above, $R^1$ to $R^6$ are each independently selected from among an organic functional group and a hydrogen atom. In addition, $R^7$ is an organic functional group, M, D, T and Q are each a number that is not less than 0 and less than 1, and are such that M+D+T+Q=1. In addition, E1≥0, E2≥0, and 0<E1+E2≤4.

Primary units that constitute an organopolysiloxane are monofunctional units [$R^3SiO_{0.5}$] (a triorganosilhemioxane; M units), difunctional units [$R^2SiO$] (a diorganosiloxane; D units), trifunctional units [$RSiO_{1.5}$] (an organosilsesquioxane; T units) and tetrafunctional units [$SiO_2$] (a silicate; Q units), and because differences in organopolysiloxane properties can be derived by altering the constituent ratio of these four types of unit, these units are selected as appropriate and an organopolysiloxane is synthesized in order to achieve desired characteristics. More specifically, M units are used for terminal capping, and triorganosiloxy groups are introduced at terminals by using M units. In addition, because straight chain components are introduced into an organopolysiloxane by introducing D units, viscosity often decreases as the amount of D units increases. In addition, because branched components are introduced into an organopolysiloxane by introducing T units and/or Q units, viscosity often increases as the amount of T units and/or Q units increases, but it is possible to increase heat resistance and increase the flame retardancy of the thermoplastic resin composition.

The molecular weight distribution (Mw/Mn) of the organopolysiloxane (C) used in the present invention is 1.01 to 1.4. By combining the organopolysiloxane (C), whose molecular weight distribution falls within such a range, with the metal salt-containing flame retardant (B), it is possible to obtain a thermoplastic resin composition that exhibits excellent flame retardancy and also exhibits excellent residence moldability (residence thermal stability) when molded. The upper limit of the molecular weight distribution is preferably 1.35, more preferably 1.3, further preferably 1.25, and particularly preferably 1.2. In addition, the lower limit of the molecular weight distribution is preferably 1.02, more preferably 1.03, further preferably 1.04, and particularly preferably 1.05. By setting the molecular weight distribution to be no higher than a suitable upper limit, the amount of low molecular weight volatile components is reduced and residence moldability is improved, which is desirable. In addition, in cases where the molecular weight distribution is set to be no higher than a suitable upper limit, it is possible to reduce the amount of high molecular weight components that exhibit poor compatibility with the thermoplastic resin, which is desirable. In addition, by setting the molecular weight distribution to be no lower than a suitable lower limit, it is possible to reduce costs required for purifying the organopolysiloxane (C), which is desirable.

Moreover, the molecular weight distribution (Mw/Mn) can generally be measured using gel permeation chromatography (GPC). More specifically, the number average molecular weight (Mn), the weight average molecular weight (Mw) and the molecular weight distribution can be measured on the basis of a calibration curve prepared using a polystyrene standard sample and using tetrahydrofuran (THF) or the like as a solvent and an eluant. In addition, it is commonly known that values for number average molecular weight, weight average molecular weight and molecular weight distribution can vary according to measurement conditions and the type of column used, but the molecular weight distribution mentioned in the present invention is a value calculated on the basis of a calibration curve prepared by using tetrahydrofuran as a solvent for sample dissolution and as an eluant, using Shodex columns KF-G, KF-402.5HQ, KF-402HQ and KF-401HQ (produced by Showa Denko K.K.) connected in that order, measuring at a flow rate of 0.3 mL/min and a temperature of 40° C. and using a polystyrene standard sample.

The number average molecular weight (Mn) of the organopolysiloxane (C) used in the present invention is not particularly limited, but is preferably 300 or more, more preferably 400 or more, further preferably 500 or more, and particularly preferably 600 or more. In addition, this number average molecular weight is preferably 2,000 or less, more preferably 1,800 or less, further preferably 1,700 or less, and particularly preferably 1,600 or less. By setting the number average molecular weight to be no lower than a suitable lower limit, the amount of volatile components is reduced and residence moldability is improved, which is desirable. In addition, by setting the number average molecular weight to be no higher than a suitable upper limit, the viscosity of the organopolysiloxane (C) decreases, the organopolysiloxane tends to be localized at a surface of a molded body, and flame retardancy is therefore improved, which is desirable. In addition, by setting the number average molecular weight to be no higher than a suitable upper limit, compatibility of the thermoplastic resin (A) with the organopolysiloxane (C) is improved, and a transparent composition tends to be obtained, which is desirable.

The weight average molecular weight (Mw) of the organopolysiloxane (C) used in the present invention is not particularly limited, but is preferably 500 or more, more preferably 600 or more, further preferably 700 or more, and particularly preferably 800 or more. In addition, this weight number average molecular weight is preferably 2,000 or less, more preferably 1,800 or less, further preferably 1,700 or less, and particularly preferably 1,600 or less. By setting the weight average molecular weight to be no lower than a suitable lower limit, the amount of volatile components is reduced and residence moldability is improved, which is desirable. In addition, by setting the weight average molecular weight to be no higher than a suitable upper limit, the viscosity of the organopolysiloxane (C) decreases, the organopolysiloxane tends to be localized at a surface of a molded body, and flame retardancy is therefore improved, which is desirable. In addition, by setting the weight average molecular weight to be no higher than a suitable upper limit, compatibility of the thermoplastic resin (A) with the organopolysiloxane (C) is improved, and a transparent composition tends to be obtained, which is desirable.

In the organopolysiloxane (C) used in the present invention, $R^1$ to $R^6$ in formula (1) above are each independently selected from among organic functional groups and a hydrogen atom. $R^1$ to $R^6$ are not particularly limited as long as these are organic groups or hydrogen atoms, and organic functional groups may include straight chain structures, branched structures and cyclic structures, and may contain oxygen atoms, nitrogen atoms, sulfur atoms and phosphorus atoms as long as the advantageous effect of the present invention is not impaired, but $R^1$ to $R^6$ are preferably organic groups having 1 to 20 carbon atoms, more preferably organic groups having 1 to 10 carbon atoms, further preferably methyl groups, ethyl groups, n-propyl groups, isopropyl groups, n-butyl groups, sec-butyl groups, isobutyl groups, tert-butyl groups, n-pentyl groups, neopentyl groups, isopentyl groups, sec-pentyl groups, 3-pentyl groups, tert-pentyl groups, n-hexyl groups, isohexyl groups, 3-methylpentyl groups, cyclopentyl groups, cyclohexyl groups, phenyl groups or naphthyl groups, and particularly preferably methyl groups or phenyl groups. By using methyl groups, which have few carbon atoms, as organic functional groups, the siloxane content in the organopolysiloxane (C), that is, the content of inorganic components, increases, meaning that heat resistance is improved, which is desirable. In addition, by using phenyl groups as organic functional groups, flame retardancy is significantly increased due to condensation between phenyl groups, which is desirable.

In cases where $R^1$ to $R^6$ contain phenyl groups, the content of phenyl groups relative to the total amount of organic groups is preferably 5 mol % or more, more preferably 8 mol % or more, and further preferably 12 mol % or more. In addition, this content is preferably 40 mol % or less, more preferably 30 mol % or less, further preferably 25 mol % or less, and particularly preferably 20 mol % or less. By setting the content of phenyl groups relative to the total amount of organic groups to be no lower than a suitable lower limit, flame retardancy is improved, which is desirable. In addition, by setting the content of phenyl groups to be no higher than the upper limit, compatibility of the organopolysiloxane (C) with a polycarbonate resin is improved and a transparent resin composition tends to be obtained, which is desirable. In addition, by setting the content of phenyl groups relative to the total amount of organic groups to be no higher than a suitable upper limit, the viscosity of the organopolysiloxane (C) can fall within a range that is not excessively high, which is desirable.

In the organopolysiloxane (C) used in the present invention, $R^7$ in formula (1) above is not particularly limited as long as this is an organic group, and the organic functional group may include straight chain structures, branched structures and cyclic structures, and may contain oxygen atoms, nitrogen atoms, sulfur atoms and phosphorus atoms as long as the advantageous effect of the present invention is not impaired, but $R^7$ is preferably an organic group having 1 to 10 carbon atoms, further preferably a methyl group, an ethyl group, an n-propyl group, an isopropyl group, an n-butyl group, a sec-butyl group, an isobutyl group, a tert-butyl group, an n-pentyl group, a neopentyl group, an isopentyl group, a sec-pentyl group, a 3-pentyl group, a tert-pentyl group, an n-hexyl group, an isohexyl group, a 3-methylpentyl group, a cyclopentyl group, a cyclohexyl group, a phenyl group or a naphthyl group, and particularly preferably a methyl group.

The amount of organooxy groups in the organopolysiloxane (C) used in the present invention is not particularly limited, but the ratio of organooxy groups relative to the total amount of organic functional groups is preferably 0.01 mol % or more, more preferably 0.5 mol % or more, and further preferably 1.0 mol % or more. In addition, this ratio is preferably 10 mol % or less, more preferably 7 mol % or less, further preferably 5 mol % or less, particularly preferably 4.5 mol % or less, and most preferably 4 mol % or less. By setting the ratio of organooxy groups relative to the total amount of organic functional groups to be no lower than a suitable lower limit, suitable fluidity is achieved, which is desirable. In addition, by setting the ratio of organooxy groups relative to the total amount of organic functional groups to be no higher than a suitable upper limit, the viscosity can be easily adjusted within a range that is not excessively low, generation of elimination components caused by organooxy groups undergoing hydrolytic condensation with undesirable timing can be suppressed, and gelation can be suppressed, which is desirable from the perspective of residence moldability.

The amounts of D units, T units and Q units relative to the total amount of silicon atoms in the organopolysiloxane (C) used in the present invention is not particularly limited, but the values of D, T and Q in formula (1) are preferably such that $0 \leq D/(T+Q) \leq 0.4$, more preferably such that $0 \leq D/(T+Q) \leq 0.25$, further preferably such that $0 \leq D/(T+Q) \leq 0.11$, particularly preferably such that $0 \leq D/(T+Q) \leq 0.053$, and most preferably such that $D=0$. In cases where the value of $D/(T+Q)$ is high, the amount of straight chain components in the organopolysiloxane is high, and in cases where the value of $D/(T+Q)$ is low, the amount of branched components in the organopolysiloxane is high. By setting the value of $D/(T+Q)$ to be no higher than a suitable upper limit, the amount of branched components in the organopolysiloxane (C) increases, meaning that heat resistance and flame retardancy are improved, which is desirable.

The amount of M units relative to the total amount of silicon atoms in the organopolysiloxane (C) used in the present invention is not particularly limited, but the value of M in formula (1) is preferably 0.30 or more, more preferably 0.35 or more, and further preferably 0.40 or more. In addition, the value of M is preferably 0.60 or less, or more preferably 0.55 or less, and further preferably 0.50 or less. By setting the value of M to be no lower than a suitable upper limit, it is possible to suppress an abnormal increase in molecular weight when the organopolysiloxane (C) is produced, which is desirable. In addition, by setting the value of M to be no higher than a suitable upper limit, it is possible to suppress generation of low boiling point components, which is desirable.

In formula (1) that represents the organopolysiloxane (C) used in the present invention, E1 denotes the amount of organooxy groups directly bonded to silicon atoms, with the amount of silicon atoms in the organopolysiloxane being 1, and E2 denotes the amount of hydroxyl groups directly bonded to silicon atoms, with the amount of silicon atoms in the organopolysiloxane being 1. That is to say, the value of E1+E2 represents the amount of so-called terminal groups, and it is generally the case that $E1 \geq 0$, $E2 \geq 0$ and $0 < E1+E2 \leq 4$, but it is preferable to set the value of E1 to be such that the ratio of organooxy groups relative to the total amount of organic functional groups falls within a preferred range.

The organopolysiloxane (C) used in the present invention may be a D resin including only D units, a T resin including only T units, an MD resin including M units and D units, an MT resin including M units and T units, an MQ resin including M units and Q units, a DT resin including D units and T units, a DQ resin including D units and Q units, a TQ resin including T units and Q units, an MTQ resin including M units, T units and Q units, a DTQ resin including D units, T units and Q units, T units and Q units, an MDQ resin including M units, D units and Q units, or an MDTQ resin including M units, D units, T units and Q units, but an MT resin, a TQ resin or an MTQ resin is preferred, an MT resin or an MTQ resin is more preferred, and an MTQ resin is particularly preferred.

The organopolysiloxane (C) used in the present invention is preferably a liquid at ordinary temperature and ordinary pressure. By being a liquid, the organopolysiloxane tends to be localized at the surface of a molded body and therefore exhibits improved flame retardancy, which is desirable. Here, ordinary temperature means a temperature range of 20° C.±15° C. (5° C. to 35° C.) and, for the sake of convenience, can be regarded as a state at 25° C. Ordinary pressure means a pressure equivalent to atmospheric pressure, and is approximately 1 atm. In addition, the term liquid means a state that exhibits fluidity.

The viscosity of the organopolysiloxane (C) used in the present invention is not particularly limited, but the viscosity measured at 25° C. is preferably 200 mPa·s or more, more preferably 300 mPa s or more, and further preferably 800 mPa·s or more. In addition, this viscosity is preferably 2,000 mPa·s or less, more preferably 1,800 mPa·s or less, and further preferably 1,700 mPa·s or less. By setting the viscosity to be no lower than an appropriate lower limit, it is possible to prevent dripping at the time of molding, and kneadability with the thermoplastic resin (A) is also improved, which is desirable. In addition, by setting the viscosity to be no higher than an appropriate upper limit, stringiness during handling is reduced, meaning that handleability is improved, and flame retardancy of the thermoplastic resin composition (A) is improved, which is desirable.

It is surmised that the mechanism by which the organopolysiloxane having a molecular weight distribution (Mw/Mn) of 1.01 to 1.4 used in the present invention exhibits flame retardancy is because a bubble-like SiC coating film is formed on the resin surface when heat is applied, and the polyorganosiloxane can be used as a flame retardancy-imparting material not only for polycarbonate resins, but also any type of resin, and preferably thermoplastic resins, and particularly preferably polycarbonate resins. In particular, it is preferable for the main chain to be a branched chain, and if the molecular weight distribution (Mw/Mn) is 1.01 to 1.4 in particular, a compound represented by formula (1) can simultaneously be advantageously used as a flame retardancy-imparting material for a variety of resins. A preferred embodiment of formula (1) is as described above in the present description. In particular, a compound for which $0.3 \leq M \leq 0.6$ and a compound that contains substantially no D units are preferred. In addition, by using the organopolysiloxane in combination with a metal salt-containing flame retardant, it is possible to impart higher flame retardancy. In addition, a compound which has a weight average molecular weight of 500 to 2,000 and which is more preferably a liquid (exhibits fluidity) at 25° C. exhibits high compatibility and can be easily mixed at an arbitrary ratio with a variety of resins, and can therefore be easily used as a flame retardancy-imparting material. In addition, a compound for which the conditions mentioned above are combined as appropriate can of course be advantageously used. In addition, the resin composition of the present invention, to which is added a organopolysiloxane having a molecular weight distribution (Mw/Mn) of 1.01 to 1.4, exhibits high flame retardancy. A more preferred embodiment of the organopolysiloxane, if added to a resin composition, is one obtained by combining the statements above and statements relating to various requirements in the description.

The method for producing the organopolysiloxane (C) used in the present invention is not particularly limited. For example, it is possible to use any type of production method, such as a method including simultaneously condensing one or more disiloxane compounds, disilazane compounds or hydrolyzates thereof or alkoxysilane compounds or hydrolyzates or partial hydrolytic condensation products thereof; a method including condensing a disiloxane compound, a disilazane compound or a hydrolyzate thereof, or a chlorosilane compound or a hydrolyzate or partial hydrolytic condensation product thereof; a method including ring opening polymerization of a cyclic siloxane compound; or chain polymerization such as anionic polymerization, and a plurality of production methods may be used in combination. In addition, an organic functional group may be converted into another organic functional group using a chemical method. An example of a method for converting an organic functional group into another organic functional group is a method including reacting an alkenyl group with a group in which a hydrogen atom is directly bonded to a silicon atom.

In addition, it is possible to fractionate an organopolysiloxane having a desired molecular weight or molecular weight distribution by subjecting an obtained organopolysiloxane to column chromatography or GPC, by extracting an obtained organopolysiloxane with a solvent, by distilling off unwanted components, or the like. In addition, low boiling point components may be removed using a process such as depressurization or heating.

When producing the organopolysiloxane (C) used in the present invention, a solvent may, or may not, be used. In cases where a solvent is used, water and organic solvents can be used, but organic solvents are particularly preferred, tetrahydrofuran, toluene, hexane, heptane, acetone, ethyl acetate, methanol, ethanol, isopropanol, chloroform and dichloromethane are more preferred, and tetrahydrofuran, toluene and methanol are further preferred from the perspectives of solubility, ease of removal and low environmental harm. In addition, it is possible to use a combination of two or more types of these organic solvents and water, and the type of solvent may differ depending on the reaction step. In addition, in cases where an organopolysiloxane skeleton is formed by subjecting an alkoxysilane compound, a chlorosilane compound, or the like, to hydrolytic condensation, it is possible to add a suitable amount of water so as to facilitate hydrolysis.

The reaction temperature when producing the organopolysiloxane (C) used in the present invention is not particularly, limited, but is generally −40° C. or higher, preferably −20° C. or higher, and more preferably 0° C. or higher. By constituting in this way, the reaction for forming the target organopolysiloxane can readily progress, which is desirable. In addition, the reaction temperature is generally 200° C. or lower, preferably 150° C. or lower, and more preferably 130° C. or lower.

When producing the organopolysiloxane (C) used in the present invention, the pressure for carrying out the reaction is not particularly limited, and is generally 0.6 atm or more, preferably 0.8 atm or more, and more preferably 0.9 atm or more. Within this range, the boiling point of the solvent can be maintained within a satisfactory range and the reaction system can be held at a satisfactory reaction temperature. In addition, the reaction is generally carried out at a pressure of 1.4 atm or less, but a pressure of 1.2 atm or less is preferred, and a pressure of 1.1 atm or less is more preferred. Within this range, the boiling point of the solvent increases and the reaction does not accelerate more than is necessary, meaning that it is possible to reduce the risk of damage to the apparatus and the risk of explosion.

The content of the organopolysiloxane (C) in the thermoplastic resin composition of the present invention is, relative to 100 parts by mass of the thermoplastic resin (A), not less than 0.05 parts by mass and less than 3 parts by mass, and is preferably 0.1 parts by mass or more, more preferably 0.2 parts by mass or more, and further preferably 0.3 parts by mass or more, and is preferably 2.5 parts by mass or less, more preferably 2 parts by mass or less, further preferably 1.5 parts by mass or less, and particularly preferably 1.3 parts by mass or less. By setting the content of the organopolysiloxane (C) to be no lower than the lower limit mentioned above, an obtained thermoplastic resin composition tends to exhibit sufficient flame retardancy, and by setting the content of the organopolysiloxane (C) to be no higher than the upper limit mentioned above, it is possible to maintain the thermal stability and hydrolysis resistance of the thermoplastic resin and it is possible to prevent a decrease in workability at the time of extrusion and prevent appearance defects and reduced mechanical strength in a molded article.

In addition, with regard to the ratio of the content of the metal salt-containing flame retardant (B) and the content of the organopolysiloxane (C), it is preferable for the content of the organopolysiloxane (C) to be higher, and the content mass ratio (C)/(B) is preferably greater than 1, and is preferably 5 or more, and more preferably 10 or more.

[Fluorinated Resin]

The thermoplastic resin composition of the present invention preferably further contains a fluorinated resin. By incorporating a fluorinated resin together with the components mentioned above, it is possible to improve the melt characteristics of the resin composition, improve dripping prevention properties when the resin composition is combusted, and further improve flame retardancy.

The fluorinated resin is preferably a fluoroolefin resin. Fluoroolefin resins are generally polymers or copolymers having a fluoroethylene structure, and specific examples thereof include difluoroethylene resins, tetrafluoroethylene resins and tetrafluoroethylene/hexafluoropropylene copolymer resins, but of these, a tetrafluoroethylene resin is preferred.

In addition, a fluorinated resin having fibril-forming ability is preferred as this fluorinated resin, and specific examples thereof include fluoroolefin resins having fibril-forming ability. Having fibril-forming ability tends to significantly improve dripping prevention properties when the resin composition is combusted.

In addition, an organic polymer-coated fluoroolefin resin can be advantageously used as the fluorinated resin. By using an organic polymer-coated fluoroolefin resin, dispersibility is improved, the surface appearance of a molded article is improved, and the occurrence of surface foreign matter can be suppressed.

The organic polymer-coated fluoroolefin resin can be produced using a variety of well-known methods, examples of which include (1) a method including mixing an aqueous dispersion of polyfluoroethylene particles and an aqueous dispersion of organic polymer particles, and then forming a powder by means of coagulation or spray drying, (2) a method including polymerizing a monomer that constitutes an organic polymer in the presence of an aqueous dispersion of polyfluoroethylene particles, and then forming a powder by means of coagulation or spray drying, and (3) a method including emulsion polymerization of a monomer having an ethylenically unsaturated bond in a mixed liquid obtained by mixing an aqueous dispersion of polyfluoroethylene particles and an aqueous dispersion of organic polymer particles, and then forming a powder by means of coagulation or spray drying.

From the perspective of dispersibility when blended with a thermoplastic resin, the monomer used to produce the organic polymer that coats the fluoroolefin resin is preferably a monomer having high affinity for the thermoplastic resin, and more preferably an aromatic vinyl monomer, a (meth)acrylic acid ester monomer or a vinyl cyanide monomer.

Moreover, the fluorinated resin may be a single type or a combination of two or more arbitrary types thereof combined at arbitrary proportions.

The content of the fluorinated resin is, relative to 100 parts by mass of the thermoplastic resin (A), preferably 0.01 to 1 parts by mass, and is more preferably 0.03 parts by mass or more, and further preferably 0.05 parts by mass or more, and is more preferably 0.8 parts by mass or less, and further preferably 0.6 parts by mass or less, and within this range is preferably 0.4 parts by mass or less and particularly preferably 0.3 parts by mass or less.

By setting the content of the fluorinated resin to be 0.01 parts by mass or more, a sufficient flame retardancy-improving effect can be achieved, and by setting the content of the fluorinated resin to be 1 part by mass or less, appearance defects are unlikely to occur and high mechanical strength can be ensured in a molded article obtained by molding the resin composition.

[Ultraviolet Absorber]

The thermoplastic resin composition of the present invention preferably further contains an ultraviolet absorber.

Examples of ultraviolet absorbers include inorganic ultraviolet absorbers such as cerium oxide and zinc oxide; and organic ultraviolet absorbers such as benzotriazole compounds, benzophenone compounds, salicylate compounds, cyanoacrylate compounds, triazine compounds, oxanilide compounds, malonic acid ester compounds and hindered amine compounds. Of these, organic ultraviolet absorbers are preferred, and benzotriazole compounds are more preferred. By selecting an organic ultraviolet absorber, the transparency and mechanical properties of the thermoplastic resin composition of the present invention are improved.

Specific examples of benzotriazole compounds include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole), 2-(2'-hydroxy-3',5'-di-tert-amyl)-benzotriazole, 2-(2'-hydroxy-5'-tert-octylphenyl)benzotriazole and 2,2'-methylenebis[4-(1,1,3,3-tetramethylbutyl)-6-(2H-benzotriazol-2-yl)phenol], and of these, 2-(2'-hydroxy-5'-tert-octylphenyl)benzotriazole and 2,2'-methylenebis[4-(1,1,3,3-tetramethylbutyl)-6-(2H-benzotriazol-2-yl)phenol] are preferred, and 2-(2'-hydroxy-5'-tert-octylphenyl)benzotriazole is particularly preferred. Specific examples of such benzotriazole compounds include "Seesorb 701", "Seesorb 705", "Seesorb 703", "Seesorb 702", "Seesorb 704" and "Seesorb 709" manufactured by Shipro Kasei Kaisha, Ltd., "Biosorb 520", "Biosorb 582", "Biosorb 580" and "Biosorb 583" manufactured by Kyodo Chemical Co., Ltd., "Kemisorb 71" and "Kemisorb 72" manufactured by Chemipro Kasei Kaisha, Ltd., "Cyasorb UV5411" manufactured by Cytec Industries, Inc., "LA-32", "LA-38", "LA-36", "LA-34" and "LA-31" manufactured by Adeka Corporation and "Tinuvin P", "Tinuvin 234", "Tinuvin 326", "Tinuvin 327" and "Tinuvin 328" manufactured by BASF.

Specific examples of benzophenone compounds include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl)methane, 2,2'-dihydroxy-4-methoxybenzophenone and 2,2'-dihydroxy-4,4'-dimethoxybenzophenone, and specific examples of such benzophenone compounds include "Seesorb 100", "Seesorb 101", "Seesorb 101S", "Seesorb 102" and "Seesorb 103" produced by Shipro Kasei Kaisha, Ltd.; "Biosorb 100", "Biosorb 110" and "Biosorb 130" produced by Kyodo Chemical Co., Ltd.; "Kemisorb 10", "Kemisorb 11", "Kemisorb 11S", "Kemisorb 12", "Kemisorb 13" and "Kemisorb 111" produced by Chemipro Kasei Kaisha, Ltd.; "Uvinul 400" reduced by BASF; "Uvinul M-40" produced by BASF; "Uvinul MS-40" produced by BASF; "Cyasorb UV9", "Cyasorb UV284", "Cyasorb UV531" and "Cyasorb UV24" produced by Cytec Industries, Inc.; and "Adekastab 1413" and "Adekastab LA-51" produced by Adeka Corporation.

Specific examples of salicylate compounds include phenyl salicylate and 4-tert-butylphenyl salicylate, and specific examples of such salicylate compounds include "Seesorb 201" and "Seesorb 202" produced by Shipro Kasei Kaisha, Ltd.; and "Kemisorb 21" and "Kemisorb 22" produced by Chemipro Kasei Kaisha, Ltd..

Specific examples of cyanoacrylate compounds include ethyl-2-cyano-3,3-diphenyl acrylate and 2-ethylhexyl-2-cyano-3,3-diphenyl acrylate, and specific examples of such cyanoacrylate compounds include "Seesorb 501" produced by Shipro Kasei Kaisha, Ltd.; "Biosorb 910" produced by Kyodo Chemical Co., Ltd.; "Uvisolator 300" produced by Daiichi Kasei Co., Ltd.; and "Uvinul N-35" and "Uvinul N-539" produced by BASF.

A specific example of an oxanilide compound is 2-ethoxy-2'-ethyloxalinic acid bisanilide, and a specific example of such an oxanilide compound is "Sanduvor VSU" produced by Clariant.

2-(alkylidene)malonic acid ester compounds are preferred as the malonic acid ester compound, and 2-(1-arylalkylidene)malonic acid ester compounds are more preferred. Specific examples of such malonic acid ester compounds include "PR-25" produced by Clariant Japan K.K.; and "B-CAP" produced by BASF.

In cases where the thermoplastic resin composition of the present invention contains an ultraviolet absorber, the content thereof is, relative to 100 parts by mass of the thermoplastic resin (A), generally 0.05 parts by mass or more and preferably 0.1 parts by mass or more, and is generally 1 part by mass or less and preferably 0.5 part by mass or less. If the content of the ultraviolet absorber is lower than the lower limit of the numerical range mentioned above, the weathering resistance improvement effect may be inadequate, and if the content of the ultraviolet absorber exceeds the upper limit of the numerical range mentioned above, mold deposits and the like occur and mold contamination can occur.

Moreover, it is possible to incorporate one type of ultraviolet absorber or an arbitrary combination of two or more types thereof combined at arbitrary proportions.

[Stabilizer]

The thermoplastic resin composition of the present invention preferably contains a stabilizer, and a phosphorus stabilizer or phenolic stabilizer is preferred as the stabilizer.

Any publicly known phosphorus stabilizer can be used as the phosphorus stabilizer. Specific examples thereof include oxoacids of phosphorus, such as phosphoric acid, phosphonic acid, phosphorous acid, phosphinic acid and polyphosphoric acid; acidic metal pyrophosphate salts, such as acidic sodium pyrophosphate, acidic potassium pyrophosphate and acidic calcium pyrophosphate; phosphate salts of group 1 or group 2B metals, such as potassium phosphate, sodium phosphate, cesium phosphate and zinc phosphate; organic phosphate compounds, organic phosphite compounds and organic phosphonite compounds, but organic phosphite compounds are particularly preferred.

Examples of organic phosphite compounds include triphenyl phosphite, tris(mononylphenyl) phosphite, tris (mononyl/dinonyl-phenyl) phosphite, tris(2,4-di-tert-butylphenyl) phosphite, monooctyl diphenyl phosphite, dioctyl monophenyl phosphite, monodecyl diphenyl phosphite, didecyl monophenyl phosphite, tridecyl phosphite, trilauryl phosphite, tristearyl phosphite, 2,2-methylenebis(4, 6-di-tert-butylphenyl)octyl phosphite.

Specific examples of such organic phosphite compounds include "Adekastab 1178", "Adekastab 2112" and "Adekastab HP-10" manufactured by Adeka Corporation, "JP-351", "JP-360" and "JP-3CP" manufactured by Johoku Chemical Co., Ltd., and "Irgafos 168" manufactured by BASF.

Moreover, it is possible to incorporate one phosphorus stabilizer or an arbitrary combination of two or more types thereof combined at arbitrary proportions.

The content of the phosphorus stabilizer is generally 0.001 parts by mass or more, preferably 0.01 parts by mass or more and more preferably 0.03 parts by mass or more, and is generally 1 part by mass or less, preferably 0.7 parts by mass or less and more preferably 0.5 parts by mass or less, relative to 100 parts by mass of the thermoplastic resin (A). In cases where the content of the phosphorus stabilizer is lower than the lower limit of the range mentioned above, the thermal stabilizing effect may be insufficient, and in cases where the content of the phosphorus stabilizer is higher than the upper limit of the range mentioned above, the advantageous effect achieved by the stabilizer reaches its limit, which may lead to a deterioration in economy.

Examples of the phenolic stabilizer include hindered phenolic antioxidants. Specific examples thereof include pentaerythritol tetrakis[3-(3,5-di-tert-butyl-4-hydroxyphenyl) propionate], octadecyl-3-(3,5-di-tert-butyl-4-hydroxyphenyl) propionate, thiodiethylenebis[3-(3,5-di-tert-butyl-4-hydroxyphenyl) propionate], N,N'-hexane-1,6-diylbis[3-(3, 5-di-tert-butyl-4-hydroxyphenyl)propionamide], 2,4-dimethyl-6-(1-methylpentadecyl)phenol, diethyl[[3,5-bis(1, 1-dimethylethyl)-4-hydroxyphenyl]methyl]phosphoate, 3,3', 3",5,5',5‘ '-hexa-tert-butyl-a,a',a"-(mesitylene-2,4,6-triyl)tri-p-cresol, 4,6-bis(octylthiomethyl)-o-cresol, ethylenebis(oxyethylene)bis[3-(5-tert-butyl-4-hydroxy-m-tolyl) propionate], hexamethylenebis[3-(3,5-di-tert-butyl-4-hydroxyphenyl) propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazine-2-ylamino) phenol and 2-[1-(2-hydroxy-3,5-di-tert-pentylphenyl)ethyl]-4,6-di-tert-pentylphenyl acrylate.

Of these, pentaerythritol tetrakis[3-(3,5-di-tert-butyl-4-hydroxyphenyl) propionate] and octadecyl-3-(3,5-di-tert-butyl-4-hydroxyphenyl) propionate are preferred. Specific examples of such phenolic antioxidants include "Irganox 1010" and "Irganox 1076" produced by BASF and "Adekastab AO-50" and "Adekastab AO-60" produced by Adeka Corporation.

Moreover, it is possible to incorporate 1 phenolic stabilizer or an arbitrary combination of 2 or more types thereof combined at arbitrary proportions.

The content of the phenolic stabilizer is generally 0.001 parts by mass or more and preferably 0.01 parts by mass or more, and is generally 1 part by mass or less and preferably 0.5 parts by mass or less, relative to 100 parts by mass of the thermoplastic resin (A). By setting the content of the phenolic stabilizer to be no lower than the lower limit of the range mentioned above, the advantageous effect of the phenolic stabilizer can be adequately exhibited. In addition, by setting the content of the phenolic stabilizer to be no higher than the upper limit of the range mentioned above, the advantageous effect of the phenolic stabilizer does not reach a limit, which is economically advantageous.

[Mold-Release Agent]

In addition, the thermoplastic resin composition of the present invention preferably contains a mold-release agent (a lubricant). Examples of mold-release agents include aliphatic carboxylic acids, esters of aliphatic carboxylic acids and alcohols, aliphatic hydrocarbon compounds having a number average molecular weight of 200 to 15,000 and polysiloxane-containing silicone oils.

It is possible to use a saturated or unsaturated aliphatic monohydric, dihydric or trihydric carboxylic acid as the aliphatic carboxylic acid. Here, aliphatic carboxylic acids also include alicyclic carboxylic acids. Of these, preferred aliphatic carboxylic acids are monohydric and dihydric carboxylic acids having 6 to 36 carbon atoms, with saturated aliphatic monohydric carboxylic acids having 6 to 36 carbon atoms being more preferred. Specific examples of such aliphatic carboxylic acids include palmitic acid, stearic acid, caproic acid, capric acid, lauric acid, arachic acid, behenic acid, lignoceric acid, cerotic acid, melissic acid, tetratriacontanoic acid, montanic acid, adipic acid and azelaic acid.

It is possible to use the same aliphatic carboxylic acids as those mentioned above as the aliphatic carboxylic acid in the ester of an aliphatic carboxylic acid and an alcohol. Meanwhile, examples of alcohols include saturated or unsaturated monohydric or polyhydric alcohols. These alcohols may have substituent groups such as fluorine atoms or aryl groups. Of these, saturated monohydric or polyhydric alcohols having 30 or fewer carbon atoms are preferred, and saturated aliphatic monohydric alcohols and saturated aliphatic polyhydric alcohols having 30 or fewer carbon atoms are more preferred. Moreover, the term aliphatic is used as a term that also encompasses alicyclic compounds.

Specific examples of such alcohols include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane and dipentaerythritol.

Moreover, the esters mentioned above may contain aliphatic carboxylic acids and/or alcohols as impurities. In addition, the esters mentioned above may be single substances, but may also be mixtures of a plurality of compounds. Furthermore, the aliphatic carboxylic acid and alcohol that bond to each other to form the ester may each be a single compound or a combination of two or more arbitrary types thereof combined at arbitrary proportions.

Specific examples of esters of aliphatic carboxylic acids and alcohols include bees wax (a mixture containing mainly myricyl palmitate), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate and pentaerythritol tetrastearate.

Examples of aliphatic hydrocarbons having a number average molecular weights of 200 to 15,000 include liquid paraffins, paraffin waxes, microcrystalline waxes, polyethylene waxes, Fischer-Tropsch Waxes and α-olefin oligomers having 3 to 12 carbon atoms. Moreover, aliphatic hydrocarbons also include alicyclic hydrocarbons. In addition, these hydrocarbons may be partially oxidized.

Of these, paraffin waxes, polyethylene waxes and partially oxidized polyethylene waxes are preferred, and paraffin waxes and polyethylene waxes are more preferred.

In addition, the number average molecular weight of the aliphatic hydrocarbons mentioned above is preferably 5,000 or less.

Moreover, the aliphatic hydrocarbon may be a single substance or a mixture of aliphatic hydrocarbons having a variety of constituent components and molecular weights, but it is preferable to use a mixture in which the primary component has a number average molecular weight that falls within the range mentioned above.

Examples of polysiloxane-containing silicone oils include dimethylsilicone oils, methylphenylsilicone oils, diphenylsilicone oils and fluorinated alkylsilicones.

Moreover, it is possible to incorporate one of the mold-release agents mentioned above or an arbitrary combination of two or more types thereof combined at arbitrary proportions.

The content of the mold-release agent is generally 0.001 parts by mass or more and preferably 0.01 parts by mass or more, and is generally 2 parts by mass or less and preferably 1 part by mass or less, relative to 100 parts by mass of the thermoplastic resin (A). By setting the content of the mold-release agent to be no lower than the lower limit of the range mentioned above, the advantageous effect of mold release properties can be adequately exhibited, and by setting the content of the mold-release agent to be no higher than the upper limit of the range mentioned above, adequate hydrolysis resistance can be achieved and mold contamination is unlikely to occur when injection molding is carried out.

[Light-Diffusing Agent]

The thermoplastic resin composition of the present invention preferably contains a light-diffusing agent. By incorporating a light-diffusing agent, it is possible to increase the light-diffusing properties of the resin composition and a molded article obtained by molding the resin composition.

Examples of light-diffusing agents include inorganic fine particles such as barium sulfate, talc, calcium carbonate, silica and glass; and organic fine particles such as acrylic resins, silicone resins, benzoguanamine resins, styrenic resins and butadienic resins. Organic fine particles are particularly preferred, and of these, acrylic fine particles and/or silicone fine particles are more preferred.

Organic fine particles having a crosslinked structure obtained by crosslinking of main chains that constitute an organic polymer are preferred as the organic fine particles. Preferred among these are particles which do not substantially deform and can maintain a finely particulate shape in a step for processing the thermoplastic resin composition of the present invention, such when the thermoplastic resin composition is injection molded.

Preferred examples of such fine particles include fine particles of acrylic resins and silicone resins.

Examples of fine particles of silicone resins include fine particles of crosslinked silicone resins and silicone powders obtained by coating a silicone rubber with a silicone resin. Of these, fine particles of silicone resins are preferred, polyorganosilsesquioxane particles are more preferred, and polymethylsilsesquioxane particles are particularly preferred from the perspective of excellent thermal stability.

In addition, fine particles of polymers based on partially crosslinked methyl methacrylate are particularly preferred as acrylic resin fine particles.

In addition, the mass average particle diameter of the light-diffusing agent is generally 0.5 μm or more, preferably 1 μm or more, and more preferably 1.5 μm or more, and is generally 30 μm or less, preferably 20 μm or less, more preferably 10 μm or less, further preferably 5 μm or less, and particularly preferably 3 μm or less. By setting the mass average particle diameter to fall within this range, excellent light diffusion properties tend to be achieved by an obtained thermoplastic resin composition, a light source cannot be seen transparently when the composition is used in a component of a lighting fixture, a light-diffusing sheet, or the like, excellent visibility tends to be achieved, and a sufficient light-diffusing effect relative to content can be ensured.

In addition, the light-diffusing agent is preferably spherical.

Moreover, the light-diffusing agent may be a single type or a combination of two or more arbitrary types thereof combined at arbitrary proportions.

The content of the light-diffusing agent is, relative to 100 parts by mass of the thermoplastic resin (A), preferably 0.01 to 5 parts by mass, and is more preferably 0.1 parts by mass or more, and further preferably 0.3 parts by mass or more, and is more preferably 4 parts by mass or less, further preferably 3 parts by mass or less, and particularly preferably 2 parts by mass or less and within this range is preferably 1.5 parts by mass or less and most preferably 1 part by mass or less.

[Elastomer]

The thermoplastic resin composition of the present invention preferably contains an elastomer.

The elastomer is preferably a copolymer obtained by graft copolymerizing a rubber component and a monomer component able to be copolymerized with the rubber component. The method for producing this type of graft copolymer can be bulk polymerization, solution polymerization, suspension polymerization, emulsion polymerization, or the like, and the copolymerization method may be single stage graft copolymerization or multistage graft copolymerization.

The glass transition temperature of the rubber component is generally 0° C. or lower, preferably −20° C. or lower, and more preferably −30° C. or lower. Specific examples of the rubber component include polyalkyl acrylate rubbers such as polybutadiene rubbers, polyisoprene rubbers, polybutyl acrylate, poly(2-ethylhexyl acrylate) and butyl acrylate-2-ethylhexyl acrylate copolymers, silicone-containing rubbers such as organopolysiloxane rubbers, butadiene-acrylic composite rubbers, IPN type composite rubbers including organopolysiloxane rubbers and polyalkyl acrylate rubbers, styrene-butadiene rubbers, ethylene-α-olefin-containing rubbers such as ethylene-propylene rubbers, ethylene-butene rubbers and ethylene-octene rubbers, ethylene-acrylic rubbers and fluororubbers. It is possible to use one of these rubber components in isolation, or a mixture of two or more types thereof. Of these, polybutadiene rubbers, polyalkyl acrylate rubbers, polyalkyl acrylate rubbers, IPN type composite rubbers including organopolysiloxane rubbers and polyalkyl acrylate rubbers, and styrene-butadiene rubbers are preferred from the perspectives of mechanical properties and surface appearance.

Specific examples of the monomer component able to be graft copolymerized with the rubber component include aromatic vinyl compounds, vinyl cyanide compounds, (meth)acrylic acid ester compounds, (meth)acrylic acid compounds, epoxy group-containing (meth)acrylic acid ester compounds such as glycidyl (meth)acrylate; maleimide compounds such as maleimide, N-methylmaleimide and N-phenylmaleimide; α,β-unsaturated carboxylic acid compounds, such as maleic acid, phthalic acid and itaconic acid, and anhydrides thereof (for example, maleic anhydride). It is possible to use one of these monomer components in isolation, or a combination of two or more types thereof. Of these, aromatic vinyl compounds, vinyl cyanide compounds, (meth)acrylic acid ester compounds and (meth)acrylic acid compounds are preferred from the perspectives of mechanical properties and surface appearance, and (meth)acrylic acid ester compounds are more preferred. Specific examples of (meth)acrylic acid ester compounds include methyl (meth)acrylate, ethyl (meth)acrylate, butyl (meth)acrylate, cyclohexyl (meth)acrylate and octyl (meth)acrylate.

From the perspectives of impact resistance and surface appearance, the elastomer used in the present invention is preferably a core/shell type graft copolymer type elastomer. Of these, a core/shell type graft copolymer including a core layer having at least one type of rubber component selected from among a polybutadiene-containing rubber, a polybutyl acrylate-containing rubber and an IPN type composite rubber including an organopolysiloxane rubber and a polyalkyl acrylate rubber and, around the core layer, a shell layer formed by copolymerizing a (meth)acrylic acid ester is preferred, and a core/shell type elastomer containing a butadienic rubber is particularly preferred. The content of the rubber component in the core/shell type graft copolymer is preferably 40 mass % or more, and more preferably 60 mass % or more. In addition, the content of a (meth)acrylic acid component is preferably 10 mass % or more.

Specific preferred examples of these core/shell type graft copolymers include methyl methacrylate-butadiene-styrene copolymers (MBS), methyl methacrylate-acrylonitrile-butadiene-styrene copolymers (MABS), methyl methacrylate-butadiene copolymers (MB), methyl methacrylate-acrylic rubber copolymers (MA), methyl methacrylate-acrylic rubber-styrene copolymers (MAS), methyl methacrylate-acrylic butadiene rubber copolymers, methyl methacrylate-acrylic butadiene rubber-styrene copolymers and methyl methacrylate-(acrylic silicone IPN rubber) copolymers. It is possible to use one such rubbery polymer in isolation, or a combination of two or more types thereof.

In cases where the thermoplastic resin composition of the present invention contains the elastomer mentioned above, the elastomer is preferably contained in a quantity of 0.5 to 40 parts by mass, and particularly preferably 1 to 30 parts by mass, and especially 2 to 20 parts by mass, relative to 100 parts by mass of the thermoplastic resin (A). In cases where the thermoplastic resin composition contains a core/shell type elastomer containing a butadienic rubber as the core in particular, it is particularly preferable for the content of the elastomer to be 0.5 to 5 parts by mass relative to 100 parts by mass of the thermoplastic resin (A). If the content of the elastomer in the thermoplastic resin composition is too low, the advantageous effect of improving impact resistance achieved by blending the elastomer cannot be adequately achieved, and if the content of the elastomer is too high, surface hardness, heat resistance and rigidity tend to decrease.

[Other Components]

The thermoplastic resin composition of the present invention may, if necessary, contain components other than those mentioned above as long as the desired physical properties are not significantly impaired. Examples of other components include a variety of resin additives. Moreover, it is possible to incorporate one of these other components or an arbitrary combination of two or more types thereof combined at arbitrary proportions.

<Resin Additives>

Examples of resin additives include dyes/pigments, anti-static agents, anti-fogging agents, anti-blocking agents, fluidity-improving agents, plasticizers, dispersing agents and antimicrobial agents. Moreover, it is possible to incorporate one resin additive or an arbitrary combination of two or more types thereof combined at arbitrary proportions.

[Production of Thermoplastic Resin Composition]

Methods for producing the thermoplastic resin composition of the present invention are not limited, and publicly known methods for producing thermoplastic resin compositions can be widely used, an example of which is a method including pre-mixing the thermoplastic resin (A), the metal salt-containing flame retardant (B), the organopolysiloxane (C) and other components to be blended as required in any of a variety of mixing machines, such as a tumbler or Henschel mixer, and then melt kneading using a mixer such as a Banbury mixer, a roller, a Brabender, a uniaxial kneading extruder, a biaxial kneading extruder, or a kneader.

It is also possible to produce the thermoplastic resin composition by not pre-mixing the components or pre-mixing only some of the components, and then supplying to an extruder by means of a feeder and carrying out melt kneading.

It is also possible to produce the thermoplastic resin composition by forming a master batch from a resin composition obtained by pre-mixing some of the components, supplying these premixed components to an extruder and melt kneading, then mixing this master batch with the remaining components and melt kneading.

In addition, in cases where a component that is difficult to disperse is mixed, it is possible to dissolve or disperse the component that is difficult to disperse in a solvent such as water or an organic solvent in advance and knead this solution or dispersion, thereby increasing dispersibility.

[Molded Article]

The thermoplastic resin composition of the present invention is molded to give a molded article.

The method for producing a molded article can be any molding method commonly used for thermoplastic resin compositions. Examples thereof include injection molding methods, ultra high speed injection molding methods, injection compression molding methods, two-color molding methods, blow molding methods such as gas-assisted methods, molding methods that use heat insulating molds, molding methods that use rapidly heated molds, foaming molding methods (including supercritical fluids), insert molding methods, IMC (in-mold coating) molding methods, extrusion molding methods, sheet molding methods, thermoforming methods, rotational molding methods, lamination molding methods, press molding methods and blow molding methods, and molding methods involving use of a hot runner method can also be used.

Of these methods, injection molding methods such as injection molding methods, ultra high speed injection molding methods and injection compression molding methods are preferred.

Examples of molded articles include components for electrical and electronic devices, outdoor electrical equipment, office automation equipment, information terminals, lens components, mechanical components, domestic appliances, motor vehicle components, construction materials, containers, leisure products, miscellaneous goods and lighting devices. Among these, the present invention is particularly suitable for use in components of electrical and electronic devices, office automation equipment, information terminals, domestic appliances, lighting devices, and the like.

EXAMPLES

The present invention will now be explained in greater detail through the use of Examples. However, it should be understood that the present invention is not limited to the Examples given below.

Moreover, in the explanations given below, the term "parts" means "parts by mass" on a mass basis unless explicitly stated otherwise.

The components used in the Examples and comparative examples are as shown in Table 2 below.

Organopolysiloxanes (C1), (C2) and (C3) produced in Production Examples 1, 2 and 3 below were used as the organopolysiloxane (C). In addition, organopolysiloxanes (CX1) and (CX2) produced in Comparative Production Examples 1 and 2 below were used as organopolysiloxanes other than component (C).

<Methods for Evaluating Organopolysiloxanes>

The organopolysiloxanes produced in the production examples and comparative production examples were evaluated using the methods described below.

(1) $^1$H-NMR

A $^1$H-NMR measurement sample was prepared by weighing out approximately 50 mg of a produced organopolysiloxane and dissolving this in approximately 1 g of deuterated acetone or deuterated dichloromethane. The proportions of phenyl groups, methyl groups and organooxy groups were calculated from the weighed out amounts and the ratio of the signal strength for each component and the signal strength of an internal standard, which were measured using a 400 MHz $^1$H-NMR apparatus (AL-400 produced by JEOL Ltd.) at a relaxation delay of 20 seconds.

(2) $^{29}$Si-NMR

A $^{29}$Si-NMR measurement solvent was obtained by adding 0.5 mass % of tris(2,4-pentanedionate) chromium III to deuterated chloroform. Approximately 1.5 g of an organopolysiloxane to be measured was weighed out, dissolved through addition of 2.5 mL of the $^{29}$Si-NMR measurement solvent mentioned above, and placed in a Teflon(registered trademark) NMR sample tube having a diameter of 10 mmΦ. Measurements were carried out using the apparatus and measurement conditions described below, and the values of M, D, T and Q in formula (1) above were calculated from the signal strength ratios.

Apparatus: JNM-ECS400 produced by JEOL Ltd., TUNABLE (10), Si-free, AT10 probe

Measurement conditions: Relaxation delay: 15 seconds, number of scans: 1024, measurement mode: non-gated decoupled pulse method (NNE), spin: none, measurement temperature: 25° C.

(3) Gel Permeation Chromatography (GPC)

The number average molecular weight (Mn), weight average molecular weight (Mw) and molecular weight distribution (Mw/Mn) of each organopolysiloxane were measured using gel permeation chromatography (GPC) under the conditions described below and calculated in terms of standard polystyrene. A sample was used as an approximately 10 mass % tetrahydrofuran solution and was filtered using a 0.45 μm filter before being measured.

Apparatus: TOSOH HL-8220 GPC (produced by Tosoh Corporation)

Columns: KF-G, KF-402.5HQ, KF-402HQ and KF-401HQ (all produced by Showa Denko K.K.), column temperature: 40° C.

Eluant: tetrahydrofuran, flow rate: 0.3 mL/min

<Raw Materials Used to Produce Organopolysiloxanes>

Hexamethyldisiloxane (produced by NuSil Technology)

Phenyltrimethoxysilane (KBM-103 produced by Shin-Etsu Chemical Co., Ltd.)

Polytetramethoxysilane (MS-51 produced by Mitsubishi Chemical Corporation)

Dimethyldimethoxysilane (KBM-22 produced by Shin-Etsu Chemical Co., Ltd.)

Toluene (produced by Kishida Chemical Co., Ltd.)

Methanol (produced by Kishida Chemical Co., Ltd.)

Heptane (produced by Kishida Chemical Co., Ltd.)

1 N hydrochloric acid (produced by Kishida Chemical Co., Ltd.)

1 N aqueous solution of potassium hydroxide (produced by Kishida Chemical Co., Ltd.)

Production Example 1 (Production of Organopolysiloxane (C1))

105 parts of hexamethyldisiloxane, 225 parts of phenyltrimethoxysilane, 11.9 parts of polytetramethoxysilane, 141 parts of toluene and 141 parts of methanol as solvents, and a mixture of 75.0 parts of 1 N hydrochloric acid and 75.0 parts of methanol as a catalyst were used as raw materials for organopolysiloxane (C1), and hydrolytic condensation was carried out for 7 hours at 30° C. 154 parts of a 1 N aqueous solution of potassium hydroxide was added, and a reaction was then carried out for a further 30 minutes at 30° C. After washing with demineralized water, solvents and unreacted compounds were distilled off, thereby obtaining organopolysiloxane (C1), which was a liquid at ordinary temperature.

The obtained organopolysiloxane (C1) was subjected to molecular weight measurements and found to have a number average molecular weight (Mn) in terms of polystyrene of 848, a weight average molecular weight (Mw) of 918, and a molecular weight distribution (Mw/Mn) of 1.08. In addition, as a result of $^1$H-NMR analysis, the amount of phenyl groups was 26.4 mol %, the amount of methyl groups was 70.9 mol % and the amount of methoxy groups was 2.7 mol % relative to the total amount of organic groups, and as a result of $^{29}$Si-NMR measurements, the values of M, D, T and Q in formula (1) above were such that M=0.452, D=0, T=0.492, Q=0.056, and D/(T+Q)=0.

Production Example 2 (Production of Organopolysiloxane (C2))

122 parts of hexamethyldisiloxane, 130 parts of phenyltrimethoxysilane, 89.2 parts of methyltrimethoxysilane, 13.8 parts of polytetramethoxysilane, 143 parts of toluene and 143 parts of methanol as solvents, and a mixture of 86.7 parts of 1 N hydrochloric acid and 86.7 parts of methanol as a catalyst were used as raw materials for organopolysiloxane (C2), and hydrolytic condensation was carried out for 7 hours at 30° C. 178 parts of a 1 N aqueous solution of potassium hydroxide was added, and a reaction was then carried out for a further 30 minutes at 30° C. After washing with demineralized water, solvents and unreacted compounds were distilled off, thereby obtaining organopolysiloxane (C2), which was a liquid at ordinary temperature.

The obtained organopolysiloxane (C2) was subjected to molecular weight measurements and found to have a number average molecular weight (Mn) in terms of polystyrene of 896, a weight average molecular weight (Mw) of 1010, and a molecular weight distribution (Mw/Mn) of 1.13. In addition, as a result of $^1$H-NMR analysis, the amount of phenyl groups was 14.8 mol %, the amount of methyl groups was 83.5 mol % and the amount of methoxy groups was 1.7 mol % relative to the total amount of organic groups, and as a result of $^{29}$Si-NMR measurements, the values of M, D, T and Q in formula (1) above were such that M=0.415, D=0, T=0.535, Q=0.050, and D/(T+Q)=0.

Production Example 3 (Production of Organopolysiloxane (C3))

375 parts of hexamethyldisiloxane, 1587 parts of phenyltrimethoxysilane, 406 parts of toluene and 406 parts of methanol as solvents, and 315 parts of 1 N hydrochloric acid as a catalyst were used as raw materials for organopolysiloxane (C3), and hydrolytic condensation was carried out for 7 hours at 40° C. 286 parts of a 2 N aqueous solution of potassium hydroxide was added, and a reaction was then carried out for a further 1 hour at 40° C. After washing with demineralized water, solvents and unreacted compounds were distilled off, thereby obtaining organopolysiloxane (C3), which was a liquid at ordinary temperature.

The obtained organopolysiloxane (C1) was subjected to molecular weight measurements and found to have a number average molecular weight (Mn) in terms of polystyrene of 850, a weight average molecular weight (Mw) of 928, and a molecular weight distribution (Mw/Mn) of 1.09. In addition, as a result of $^1$H-NMR analysis, the amount of phenyl groups was 27.5 mol %, the amount of methyl groups was 70.3 mol % and the amount of methoxy groups was 2.2 mol % relative to the total amount of organic groups, and as a result of $^{29}$Si-NMR measurements, the values of M, D, T and Q in formula (1) above were such that M=0.459, D=0, T=0.541, Q=0, and D/(T+Q)=0.

In addition, organopolysiloxanes (CX1) and (CX2) produced in Comparative Production Examples 1 and 2 below were used as organopolysiloxanes that do not correspond to organopolysiloxane (C).

Comparative Production Example 1 (Production of Organopolysiloxane (CX1))

100 parts of dimethyldimethoxysilane, 385 parts of phenyltrimethoxysilane, 323 parts of toluene and 162 parts of methanol as solvents, and 46.8 parts of 1 N hydrochloric acid as a catalyst were used as raw materials for organopolysiloxane (CX1), and hydrolytic condensation was carried out for 7 hours at 30° C. After adding 500 parts of heptane, the aqueous phase was removed, and solvents and unreacted compounds were distilled off, thereby obtaining organopolysiloxane (CX1), which was a liquid at ordinary temperature.

The obtained organopolysiloxane (CX1) was subjected to molecular weight measurements and found to have a number average molecular weight (Mn) in terms of polystyrene of 803, a weight average molecular weight (Mw) of 1390, and a molecular weight distribution (Mw/Mn) of 1.73. In addition, as a result of $^1$H-NMR analysis, the amount of phenyl groups was 32.7 mol %, the amount of methyl groups was 27.7 mol % and the amount of methoxy groups was 39.6 mol % relative to the total amount of organic groups, and as a result of $^{29}$Si-NMR measurements, the values of M, D, T and Q in formula (1) above were such that M=0, D=0.304, T=0.696, Q=0, and D/(T+Q)=0.44.

Comparative Production Example 2 (Production of Organopolysiloxane (CX2))

100 parts of dimethyldimethoxysilane, 330 parts of phenyltrimethoxysilane, 287 parts of toluene and 143 parts of methanol as solvents, and 41.5 parts of 1 N hydrochloric acid as a catalyst were used as raw materials for organopolysiloxane (CX2), and hydrolytic condensation was carried out for 7 hours at 30° C. After adding 500 parts of heptane, the aqueous phase was removed, and solvents and unreacted compounds were distilled off, thereby obtaining organopolysiloxane (CX2), which was a liquid at ordinary temperature.

The obtained organopolysiloxane (CX2) was subjected to molecular weight measurements and found to have a number average molecular weight (Mn) in terms of polystyrene of 838, a weight average molecular weight (Mw) of 1250, and a molecular weight distribution (Mw/Mn) of 1.49. In addition, as a result of $^1$H-NMR analysis, the amount of phenyl groups was 33.1 mol %, the amount of methyl groups was 34.0 mol % and the amount of methoxy groups was 32.9 mol % relative to the total amount of organic groups, and as a result of $^{29}$Si-NMR measurements, the values of M, D, T and Q in formula (1) above were such that M=0, D=0.328, T=0.672, Q=0, and D/(T+Q)=0.49.

Organopolysiloxanes (C1) to (C3) and Organopolysiloxanes (CX1) and (CX2) are as shown in Table 1 below.

TABLE 1

|  | Code | Weight average molecular weight | Molecular weight distribution | Ratio of phenyl groups relative to all organic groups (mol %) | Ratio of organooxy groups relative to all organic groups (mol %) | Value of D/(T + Q) in formula (1) |
|---|---|---|---|---|---|---|
| Polyorganosiloxane (C) | C1 | 918 | 1.08 | 26.4 | 2.7 | 0 |
|  | C2 | 1010 | 1.13 | 14.8 | 1.7 | 0 |
|  | C3 | 928 | 1.09 | 27.5 | 2.2 | 0 |
| Polyorganosiloxane (CX) other than (C) | CX1 | 1390 | 1.73 | 32.7 | 39.6 | 0.44 |
|  | CX2 | 1250 | 1.49 | 33.1 | 32.9 | 0.49 |

TABLE 2

| Component | Code | |
|---|---|---|
| Thermoplastic resin (A) | A1 | Substantially straight chain aromatic polycarbonate resin produced by interfacial polymerization using bisphenol A as starting material Viscosity average molecular weight: 14,000, structural viscosity index: 1.0, branching amount: 0 mol % |
|  | A2 | Substantially straight chain aromatic polycarbonate resin produced by interfacial polymerization using bisphenol A as starting material Viscosity average molecular weight: 16,000, structural viscosity index: 1.0, branching amount: 0 mol % |
|  | A3 | Substantially straight chain aromatic polycarbonate resin produced by interfacial polymerization using bisphenol A as starting material Viscosity average molecular weight: 21,000, structural viscosity index: 1.0, branching amount: 0 mol % |
|  | A4 | Substantially straight chain aromatic polycarbonate resin produced by interfacial polymerization using bisphenol A as starting material Viscosity average molecular weight: 23,000, structural viscosity index: 1.0, branching amount: 0 mol % |
|  | A5 | Aromatic polycarbonate resin produced using interfacial polymerization method disclosed in Example 1 (PC1) in WO2011/132510 Viscosity average molecular weight: 64,000, Structural viscosity index: not measurable due to excessively high viscosity, branching amount: 0 mol % |
|  | A6 | Branched chain aromatic polycarbonate resin produced by solution polymerization using bisphenol A as starting material Viscosity average molecular weight: 28,000, structural viscosity index: 1.6, branching amount: 0.7 mol % |
|  | A7 | Aromatic polycarbonate resin produced using interfacial polymerization method using bisphenol A as starting material and blending 0.3 mol % of tris(hydroxyphenyl)ethane Viscosity average molecular weight: 26,000, structural viscosity index: 1.4, branching amount: 0.3 mol % |
|  | A8 | Aromatic polycarbonate resin produced by melt transesterification using bisphenol C as starting material Viscosity average molecular weight: 26,000, structural viscosity index: 1.4, branching amount: 0.4 mol % |
| Metal salt-containing flame retardant (B) | B1 | Potassium perfluorobutane sulfonate Bayowet C4 produced by Lanxess |
| UV absorber | D1 | 2-(2-hydroxy-5-(1,1,3,3-tetramethylbutyl)phenyl)benzotriazole Seesorb 709 produced by Shipro Kasei Kaisha, Ltd. |
| Stabilizer | E1 | Tris(2,4-di-tert-butylphenyl) phosphite Adekastab 2112 produced by Adeka Corporation |
|  | E2 | Pentaerythritol tetrakis [3-(3,5-di-tert-butyl-4-hydroxyphenyl) propionate] Irganox 1010 produced by BASF |
| Mold release agent | F1 | Pentaerythritol tetrastearate VPG861 produced by Emery Oleochemicals |
|  | F2 | Stearyl stearate Unistar M-9676 produced by NOF Corp. |
| Light-diffusing agent | G1 | Acrylic light-diffusing agent Ganzpearl GM0205S produced by Aica Kogyo Co., Ltd. |
|  | G2 | Polymethylsilsesquioxane light-diffusing agent Tospearl 120 produced by Momentive |
| Fluorinated resin | H1 | Polytetrafluoroethylene PTFE 6-J produced by Dupont-Mitsui Fluorochemicals Co., Ltd. |
| Elastomer | J1 | Butadiene rubber core/acrylic shell type core/shell elastomer M711 produced by Kaneka Corp. |

Examples 1 to 23 and Comparative Examples 1 to 14

[Production of Resin Pellets]

Components shown in Tables 1 and 2 were blended at the proportions (mass ratios) shown in Table 3 onwards below, and homogeneously mixed using a tumbler mixer so as to obtain a mixture. This mixture was supplied to a twin screw extruder (TEM26SX produced by Toshiba Machine Co., Ltd.), kneaded at a screw rotation speed of 100 rpm, a discharge rate of 25 kg/hour and a barrel temperature of 280° C., and extruded as a strand from the tip of an extrusion nozzle. The extruded product was rapidly cooled in a water bath, and then cut and pelletized using a pelletizer to obtain pellets of the polycarbonate resin composition.

<Haze(3 mmt)>

The obtained pellets were dried for 4 hours at 120° C., a two-step plate measuring 111 mm×36 mm and having parts with thicknesses of 2 mm and 3 mm was formed using an injection molding machine (SE-50DUZ produced by Sumitomo Heavy Industries, Ltd.) at a cylinder temperature of 300° C. and a die temperature of 80° C., and the haze value (units: %) of the 3 mm thick part of the two step plate was measured using a turbidimeter (NDH-2000 produced by Nippon Denshoku Industries Co., Ltd.).

<Flame retardancy: UL-94>

The obtained pellets were dried for 4 hours at 120° C., and flammability test samples measuring 125 mm×13 mm and having a thickness of 1.0 mm, 1.3 mm or 1.5 mm were formed using an injection molding machine (SE-100 produced by Sumitomo Heavy Industries, Ltd.) at a cylinder temperature of 260° C. and a die temperature of 80° C.

The obtained flammability test samples were subjected to a vertical flammability test in accordance with UL94V.

<Residence Moldability (Residence Thermal Stability)>

The obtained pellets were dried for 4 hours at 120° C., and a two-step plate having the shape and dimensions shown in FIG. 1 and having parts with thicknesses of 2 mm and 3 mm was formed using an injection molding machine (SE-50DUZ produced by Sumitomo Heavy Industries, Ltd.) at a cylinder temperature of 310° C. and a die temperature of 80° C. At this point, after molding using a normal cycle, the molding machine was temporarily stopped, the molten resin was held in the injection cylinder for 5 minutes, and the two step plate was then formed.

The surface appearance of the 2 mm thick part and that of 3 mm thick part of the obtained two step plate were observed by eye and evaluated using the following three point scale.

A: Surface defects (silvering or the like) not observed.
B: Surface defects (silvering or the like) observed in the 3 mm thick part.
C: Surface defects (silvering or the like) observed in the 2 mm thick part and the 3 mm thick part.

The evaluation results are shown in Tables 3 to 8 below.

TABLE 3

| | | Example | | | | Comparative Example | | | | |
|---|---|---|---|---|---|---|---|---|---|---|
| | | 1 | 2 | 3 | 4 | 1 | 2 | 3 | 4 | 5 |
| Thermoplastic resin (A) | A1 | 30 | 30 | 30 | 30 | 30 | 30 | 30 | 30 | 30 |
| | A2 | 45 | 45 | 45 | 45 | 45 | 45 | 45 | 45 | 45 |
| | A3 | | | | | | | | | |
| | A4 | | | | | | | | | |
| | A5 | 25 | 25 | 25 | 25 | 25 | 25 | 25 | 25 | 25 |
| | A6 | | | | | | | | | |
| | A7 | | | | | | | | | |
| | A8 | | | | | | | | | |
| Polyorganosiloxane | C1 | 1 | 0.5 | 0.5 | 1 | | 0.01 | 5 | | |
| | C2 | | | | | | | | | |
| | CX1 | | | | | | | | 1 | |
| | CX2 | | | | | | | | | 1 |
| Metal salt-containing flame retardant (B) | B1 | 0.05 | 0.05 | 0.1 | 0.05 | 0.05 | 0.05 | 0.05 | 0.05 | 0.1 |
| UV absorber | D1 | | 0.3 | 0.3 | 0.3 | 0.3 | 0.3 | 0.3 | 0.3 | 0.3 |
| Stabilizer | E1 | 0.03 | 0.03 | 0.03 | 0.03 | 0.03 | 0.03 | 0.03 | 0.03 | 0.03 |
| Release agent | F1 | 0.1 | 0.1 | 0.1 | 0.1 | 0.1 | 0.1 | 0.1 | 0.1 | 0.1 |
| | F2 | 0.1 | 0.1 | 0.1 | 0.1 | 0.1 | 0.1 | 0.1 | 0.1 | 0.1 |
| Haze (3 mmt) | | 0.4 | 0.3 | 0.4 | 0.4 | 0.4 | 0.4 | Extrusion not possible | 23.2 | 4 |
| Residence moldability | | A | A | A | A | A | A | | C | C |
| Flame retardancy (1.0 mmt) | | V-0 | V-0 | V-0 | V-0 | V-2 | V-2 | | V-0 | V-0 |

Flammability results were, from good to bad, V-0, V-1, V-2 and HB, with samples that were out of specification being classified as NG.

<Flame Retardancy: UL-94-5V (2.5 Mmt)>

The obtained pellets were dried for 5 hours at 120° C., and a UL94 5V Bar test sample (125 mm×12.5 mm×2.5 mmt) was formed using an injection molding machine (SE100DU produced by Sumitomo Heavy Industries, Ltd.) at a cylinder temperature of 280° C. and a die temperature of 80° C.

In addition, the obtained pellets were dried for 5 hours at 120° C., and a 5V Plate test sample (150 mm×150 mm×2.5 mmt) was formed using an injection molding machine (EC-160 produced by Toshiba Machine Co., Ltd.) at a cylinder temperature of 290° C. and a die temperature of 80° C.

The obtained flammability test samples (Bar and Plat types) were appraised in terms of 5VA and 5VB in accordance with UL94-5V. Samples that did not meet appraisal criteria for 5VA or 5VB were recorded as NR.

TABLE 4

| | | Example | | Comp. Example | |
|---|---|---|---|---|---|
| | | 5 | 6 | 6 | 7 |
| Thermoplastic resin (A) | A1 | 30 | 30 | 30 | 30 |
| | A2 | 45 | 45 | 45 | 45 |
| | A3 | | | | |
| | A4 | | | | |
| | A5 | 25 | 25 | 25 | 25 |
| | A6 | | | | |
| | A7 | | | | |
| | A8 | | | | |
| Polyorganosiloxane | C1 | | | | |
| | C2 | 0.5 | 1 | 0.01 | 5 |
| | CX1 | | | | |
| | CX2 | | | | |

TABLE 4-continued

|  |  | Example | | Comp. Example | |
|---|---|---|---|---|---|
|  |  | 5 | 6 | 6 | 7 |
| Metal salt-containing flame retardant (B) | B1 | 0.05 | 0.05 | 0.05 | 0.05 |
| UV absorber | D1 | 0.3 | 0.3 | 0.3 | 0.3 |
| Stabilizer | E1 | 0.03 | 0.03 | 0.03 | 0.03 |
| Release agent | F1 | 0.1 | 0.1 | 0.1 | 0.1 |
|  | F2 | 0.1 | 0.1 | 0.1 | 0.1 |
| Haze (3 mmt) |  | 30.4 | 53.3 | 1.2 | Extrusion not possible |
| Residence moldability |  | A | A | A |  |
| Flame retardancy (1.5 mmt) |  | V-0 | V-0 | V-2 |  |

TABLE 5

|  |  | Example | | Comp. Example | |
|---|---|---|---|---|---|
|  |  | 7 | 8 | 8 | 9 |
| Thermoplastic resin (A) | A1 |  |  |  |  |
|  | A2 | 20 | 20 | 20 | 20 |
|  | A3 |  |  |  |  |
|  | A4 |  |  |  |  |
|  | A5 |  |  |  |  |
|  | A6 |  | 80 |  | 80 |
|  | A7 | 80 |  | 80 |  |
|  | A8 |  |  |  |  |
| Polyorganosiloxane | C1 | 1 | 1 |  |  |
|  | C2 |  |  |  |  |
|  | CX1 |  |  |  |  |
|  | CX2 |  |  |  |  |
| Metal salt-containing flame retardant (B) | B1 | 0.05 | 0.05 | 0.05 | 0.05 |
| UV absorber | D1 | 0.3 | 0.3 | 0.3 | 0.3 |
| Stabilizer | E1 | 0.03 | 0.03 | 0.03 | 0.03 |
| Release agent | F1 | 0.1 | 0.1 | 0.1 | 0.1 |
|  | F2 | 0.1 | 0.1 | 0.1 | 0.1 |
| Haze (3 mmt) |  | 0.7 | 0.7 | 0.7 | 0.7 |
| Residence moldability |  | A | A | A | A |
| Flame retardancy (1.5 mmt) |  | V-0 | V-0 | V-2 | V-2 |

In view of Table 3, Table 4 and Table 5, it is understood that organopolysiloxanes having a molecular weight distribution of 1.01 to 1.4 improve the flame retardancy of an aromatic ring-containing polycarbonate resin and significantly improve residence moldability (residence thermal stability).

TABLE 6

|  |  | Example | | | | | | | | | Comp. Example | | |
|---|---|---|---|---|---|---|---|---|---|---|---|---|---|
|  |  | 9 | 10 | 11 | 12 | 13 | 14 | 15 | 16 | 17 | 10 | 11 | 12 |
| Thermoplastic resin (A) | A1 | 30 | 30 | 30 |  |  |  |  |  |  | 30 | 30 | 30 |
|  | A2 | 45 | 45 | 45 | 20 | 20 | 20 | 20 |  |  | 45 | 45 | 45 |
|  | A3 |  |  |  |  |  |  |  |  |  |  |  |  |
|  | A4 |  |  |  |  |  |  |  | 100 | 100 |  |  |  |
|  | A5 | 25 | 25 | 25 |  |  |  |  |  |  | 25 | 25 | 25 |
|  | A6 |  |  |  | 80 | 80 |  |  |  |  |  |  |  |
|  | A7 |  |  |  |  |  | 80 | 80 |  |  |  |  |  |
|  | A8 |  |  |  |  |  |  |  |  |  |  |  |  |
| Polyorganosiloxane | C1 | 1 | 1 | 1 | 1 | 1 | 1 | 1 | 0.1 | 0.1 |  |  |  |
|  | C2 |  |  |  |  |  |  |  |  |  |  |  |  |
|  | CX1 |  |  |  |  |  |  |  |  |  | 1 | 1 | 1 |
|  | CX2 |  |  |  |  |  |  |  |  |  |  |  |  |
| Metal salt-containing flame retardant (B) | B1 | 0.05 | 0.05 | 0.05 | 0.05 | 0.05 | 0.05 | 0.05 | 0.1 | 0.1 | 0.05 | 0.05 | 0.05 |
| UV absorber | D1 | 0.3 | 0.3 | 0.3 | 0.3 | 0.3 | 0.3 | 0.3 | 0.3 | 0.3 | 0.3 | 0.3 | 0.3 |
| Stabilizer | E1 | 0.03 | 0.03 | 0.03 | 0.03 | 0.03 | 0.03 | 0.03 | 0.03 | 0.03 | 0.03 | 0.03 | 0.03 |
|  | E2 |  |  |  |  |  |  |  | 0.05 | 0.05 |  |  |  |
| Release agent | F1 | 0.1 | 0.1 | 0.1 | 0.1 | 0.1 | 0.1 | 0.1 | 0.08 | 0.08 | 0.1 | 0.1 | 0.1 |
|  | F2 | 0.1 | 0.1 | 0.1 | 0.1 | 0.1 | 0.1 | 0.1 | 0.08 | 0.08 | 0.1 | 0.1 | 0.1 |
| Light-diffusing agent | G1 |  | 0.5 |  | 0.5 |  | 0.5 |  |  |  |  | 0.5 |  |
|  | G2 |  |  | 0.4 |  | 0.4 |  | 0.4 |  |  |  |  | 0.4 |
| Fluorinated resin | H1 | 0.1 | 0.1 | 0.1 | 0.1 | 0.1 | 0.1 | 0.1 | 0.1 | 0.3 | 0.1 | 0.1 | 0.1 |
| Residence moldability |  | A | A | A | A | A | A | A | A | A | C | C | C |
| Flame retardancy (1.5 mmt) |  | V-0 | V-0 | V-0 | V-0 | V-0 | V-0 | V-0 | V-0 | V-0 | V-0 | V-0 | V-0 |

In view of Table 6, it is understood that even if a fluorinated resin and a light-diffusing agent are used in combination, organopolysiloxanes having a molecular weight distribution of 1.01 to 1.4 exhibit improved residence moldability (residence thermal stability) compared to organopolysiloxanes having a molecular weight distribution of greater than 1.4.

TABLE 7

|  |  | Example | | | | Comp. Example |
|---|---|---|---|---|---|---|
|  |  | 18 | 19 | 20 | 21 | 13 |
| Thermoplastic resin (A) | A1 | | | | | |
|  | A2 | | | | | |
|  | A3 | | | | 100 | |
|  | A4 | 100 | 100 | 100 | | 100 |
|  | A5 | | | | | |
|  | A6 | | | | | |
|  | A7 | | | | | |
|  | A8 | | | | | |
| Polyorganosiloxane | C1 | 0.1 | 0.1 | 0.3 | 0.1 | 4 |
|  | C2 | | | | | |
|  | CX1 | | | | | |
|  | CX2 | | | | | |
| Metal salt-containing flame retardant (B) | B1 | 0.1 | 0.1 | 0.1 | 0.1 | 0.1 |
| UV absorber | D1 | | 0.3 | 0.3 | 0.3 | 0.3 |
| Stabilizer | E1 | 0.03 | 0.03 | 0.03 | 0.03 | 0.03 |
|  | E2 | 0.05 | 0.05 | 0.05 | 0.05 | 0.05 |
| Release agent | F1 | 0.08 | 0.08 | 0.08 | 0.08 | 0.08 |
|  | F2 | 0.08 | 0.08 | 0.08 | 0.08 | 0.08 |
| Light-diffusing agent | G1 | | | | | |
|  | G2 | | | | | |
| Fluorinated resin | H1 | 0.2 | 0.2 | 0.2 | 0.2 | 0.2 |
| Residence moldability | | A | A | A | A | A |
| Flame retardancy (1.0 mmt) | | V-0 | V-0 | V-0 | V-0 | V-1 |
| Flame retardancy (2.5 mmt)/5VB | | 5VB | 5VB | 5VB | 5VB | — |
| Flame retardancy (2.5 mmt)/5VA | | 5VA | 5VA | 5VA | 5VA | — |

TABLE 8

|  |  | Example | | Comp. Example |
|---|---|---|---|---|
|  |  | 22 | 23 | 14 |
| Thermoplastic resin (A) | A1 | | | |
|  | A2 | | | |
|  | A3 | | 100 | |
|  | A4 | 100 | | 100 |
|  | A5 | | | |
|  | A6 | | | |
|  | A7 | | | |
|  | A8 | | | |
| Polyorganosiloxane | C1 | 0.1 | 0.1 | |
|  | C2 | | | |
|  | CX1 | | | |
|  | CX2 | | | |
| Metal salt-containing flame retardant (B) | B1 | 0.08 | 0.08 | 0.08 |
| UV absorber | D1 | 0.3 | 0.3 | 0.3 |
| Stabilizer | E1 | 0.05 | 0.05 | 0.05 |
|  | E2 | 0.1 | 0.1 | 0.1 |
| Release agent | F1 | 0.08 | 0.08 | 0.08 |
|  | F2 | 0.08 | 0.08 | 0.08 |
| Light-diffusing agent | G1 | | | |
|  | G2 | | | |
| Fluorinated resin | H1 | 0.3 | 0.3 | 0.3 |
| Elastomer | J1 | 2 | 2 | 2 |
| Residence moldability | | A | A | A |
| Flame retardancy (1.3 mmt) | | V-0 | V-0 | V-1 |

Examples 24 to 31 and 43 and Comparative Examples 15 to 23

[Production of Resin Pellets]

Components shown in Table 9 below were blended at the proportions (mass ratios) shown in Tables 10 and 11 below, and homogeneously mixed using a tumbler mixer so as to obtain a mixture. This mixture was supplied to a twin screw extruder (TEM26SX produced by Toshiba Machine Co., Ltd.), kneaded at a screw rotation speed of 100 rpm, a discharge rate of 25 kg/hour and a barrel temperature of 280° C., and extruded as a strand from the tip of an extrusion nozzle. The extruded product was rapidly cooled in a water bath, and then cut and pelletized using a pelletizer to obtain pellets of the polycarbonate resin composition.

TABLE 9

| Component | Code | |
|---|---|---|
| Thermoplastic resin (A) | A4 | Substantially straight chain aromatic polycarbonate resin produced by interfacial polymerization using bisphenol A as starting material Viscosity average molecular weight: 23,000, structural viscosity index: 1.0, branching amount: 0 mol % |
| Metal salt-containing flame retardant (B) | B1 | Potassium nonafluorobutane sulfonate Bayowet C4 produced by Lanxess |
|  | B2 | Potassium trifluoromethane sulfonate EF12 produced by Mitsubishi Materials Electronic Chemicals Co., Ltd. |
|  | B3 | Sodium para-toluene sulfonate Chemguard NATS produced by Chembridge International |
| Polyorganosiloxane | C1 | Polyorganosiloxane obtained in Production Example 1 Weight average molecular weight: 918, molecular weight distribution: 1.08 |
| UV absorber | D1 | 2-(2-hydroxy-5-(1,1,3,3-tetramethylbutyl)phenyl)benzotriazole Seesorb 709 produced by Shipro Kasei Kaisha, Ltd. |
| Stabilizer | E1 | Tris(2,4-di-tert-butylphenyl) phosphite Adekastab 2112 produced by Adeka Corporation |
|  | E2 | Pentaerythritol tetrakis [3-(3,5-di-tert-butyl-4-hydroxyphenyl) propionate] Irganox 1010 produced by BASF |

TABLE 9-continued

| Component | Code | |
|---|---|---|
| Release agent | F1 | Pentaerythritol tetrastearate |
| | | VPG861 produced by Emery Oleochemicals |
| | F2 | Stearyl stearate |
| | | Unistar M-9676 produced by NOF Corp. |
| Fluorinated resin | H2 | Polytetrafluoroethylene |
| | | FA-500H produced by Daikin Industries, Ltd. |
| | H3 | Polytetrafluoroethylene |
| | | FA-5601 produced by Daikin Industries, Ltd. |
| Elastomer | J1 | Core/shell elastomer comprising butadiene rubber core and methyl methacrylate shell; |
| | | M711 produced by Kaneka Corp. |
| | J2 | Core/shell elastomer comprising butadiene rubber core and methyl methacrylate/styrene shell; |
| | | M722 produced by Kaneka Corp. |
| | J3 | Core/shell elastomer comprising butadiene rubber core and methyl methacrylate/styrene shell; |
| | | M732 produced by Kaneka Corp. |
| | J4 | Core/shell elastomer comprising butadiene rubber core and methyl methacrylate shell; |
| | | E875A produced by Mitsubishi Chemical Corporation |
| | J5 | Core/shell graft copolymer comprising siloxane-acrylate rubber core and methyl methacrylate shell; |
| | | SX005 produced by Mitsubishi Chemical Corporation |
| | J6 | Core/shell graft copolymer comprising siloxane-acrylate rubber core and methyl methacrylate shell; |
| | | S-2030 produced by Mitsubishi Chemical Corporation |

<Discharge rate per unit time; Q value (units: $\times 10^{-2}$ cm$^3$/sec)>

Pellets obtained using the method described above were dried for 5 to 7 hours at 120° C. using a hot air circulation type dryer, and then measured in terms discharge rate per unit time (Q value; units: $\times 10^{-2}$ cm$^3$/sec) of a composition using an elevated flow tester at a temperature of 280° C. and a load of 1.6 kgf. Moreover, a tester having an orifice with a diameter of 1 mm and a length of 10 mm was used.

<Impact Resistance>

Pellets obtained using the method described above were dried for 5 hours at 120° C., and an ISO multipurpose test piece (3 mmt) was then formed using an injection molding machine (NEX80III produced by Nissei Plastic Industrial Co., Ltd.) at a cylinder temperature of 290° C. and a die temperature of 80° C.

Using the ISO obtained multipurpose test piece (3 mmt), the notched Charpy impact strength (units: kJ/m$^2$) was measured in accordance with IS0179 at temperatures of 23° C. and −30° C.

<Flame Retardancy: UL-94 (1.5 Mmt)>

The obtained pellets were dried for 4 hours at 120° C., and a flammability test sample measuring 125 mm×13 mm and having a thickness of 1.5 mm was formed using an injection molding machine (SE-100 produced by Sumitomo Heavy Industries, Ltd.) at a cylinder temperature of 280° C. and a die temperature of 80° C.

The obtained flammability test sample was subjected to a vertical flammability test in accordance with UL94V. Flammability results were, from good to bad, V-0, V-1, V-2 and HB, with samples that were out of specification being classified as NG.

<Flame Retardancy: UL-94-5V (3 Mmt)>

The obtained pellets were dried for 5 hours at 120° C., and a UL94 5V Bar test sample (125 mm×12.5 mm×3.0 mmt) was formed using an injection molding machine (SE100DU produced by Sumitomo Heavy Industries, Ltd.) at a cylinder temperature of 280° C. and a die temperature of 80° C.

The obtained pellets were dried for 5 hours at 120° C., and a 5V Plate test sample (150 mm×150 mm×3.0 mmt) was formed using an injection molding machine (EC-160 produced by Toshiba Machine Co., Ltd.) at a cylinder temperature of 290° C. and a die temperature of 80° C.

The obtained flammability test samples (Bar and Plat types) were appraised in terms of 5VA and 5VB in accordance with UL94-5V. Samples that did not meet appraisal criteria for 5VA or 5VB were recorded as NR.

<Flammability Following Exposure to Water>

The obtained flammability test samples measuring 125 mm×13 mm×1.5 mm thick were immersed in warm water having a temperature of 82° C. for 7 days, and then subjected to a vertical flammability test in accordance with UL94V.

The results of these tests are shown in Tables 10 and 11 below.

TABLE 10

| | | Example | | | | | | | | | |
|---|---|---|---|---|---|---|---|---|---|---|---|
| | | 24 | 25 | 26 | 27 | 28 | 29 | 30 | 31 | 43 |
| Thermoplastic resin (A) | A4 | 100 | 100 | 100 | 100 | 100 | 100 | 100 | 100 | 100 |
| Metal salt-containing flame retardant (B) | B1 | 0.08 | 0.08 | 0.08 | 0.06 | | 0.08 | 0.08 | 0.08 | 0.03 |
| | B2 | | | | | 0.06 | | | | 0.03 |
| | B3 | | | | | | | | | |
| Butadiene-containing elastomer | J1 | 2.06 | 2.06 | 2.06 | 2.06 | 2.06 | | | | 2.06 |
| | J2 | | | | | | 2.06 | | | |
| | J3 | | | | | | | 2.06 | | |
| | J4 | | | | | | | | 2.06 | |
| Silicone-containing elastomer | J5 | | | | | | | | | |
| | J6 | | | | | | | | | |
| Polyorganosiloxane | C1 | 0.10 | 0.10 | 0.10 | 0.10 | 0.10 | 0.10 | 0.10 | 0.10 | 0.10 |
| Fluorinated resin | H2 | 0.31 | 0.31 | | 0.31 | 0.31 | 0.31 | 0.31 | 0.31 | 0.31 |
| | H3 | | | 0.30 | | | | | | |

TABLE 10-continued

|  |  | Example | | | | | | | | |
|---|---|---|---|---|---|---|---|---|---|---|
|  |  | 24 | 25 | 26 | 27 | 28 | 29 | 30 | 31 | 43 |
| Stabilizer | E1 | 0.05 | 0.05 | 0.05 | 0.05 | 0.05 | 0.05 | 0.05 | 0.05 | 0.05 |
|  | E2 | 0.10 | 0.10 | 0.10 | 0.10 | 0.10 | 0.10 | 0.10 | 0.10 | 0.10 |
| Release agent | F1 | 0.08 | 0.08 | 0.08 | 0.08 | 0.08 | 0.08 | 0.08 | 0.08 | 0.08 |
|  | F2 | 0.08 | 0.08 | 0.08 | 0.08 | 0.08 | 0.08 | 0.08 | 0.08 | 0.08 |
| UV absorber | D1 |  | 0.31 | 0.31 | 0.31 | 0.31 | 0.31 | 0.31 | 0.31 | 0.31 |
| Q value | $\times 10^{-2}$ cc/sec | 5.8 | 5.8 | 5.8 | 5.9 | 5.8 | 5.7 | 5.7 | 5.7 | 5.8 |
| Notched Charpy | 23° C. kJ/m$^2$ | 72 | 74 | 71 | 72 | 70 | 69 | 70 | 70 | 71 |
| impact strength | −30° C. kJ/m$^2$ | 47 | 45 | 46 | 46 | 43 | 29 | 30 | 31 | 44 |
| Combustibility | 1.5 mm V-0 | V-0 | V-0 | V-0 | V-0 | V-0 | V-0 | V-0 | V-0 | V-0 |
|  | 3 mm 5VB | 5VB | 5VB | 5VB | 5VB | 5VB | 5VB | 5VB | 5VB | 5VB |
|  | 3 mm 5VA | 5VA | 5VA | 5VA | 5VA | 5VA | 5VA | 5VA | 5VA | 5VA |
| Flammability following exposure to water | 1.5 mm V-0 | V-0 | V-0 | V-0 | V-0 | V-0 | V-0 | V-0 | V-0 | V-0 |

TABLE 11

|  |  | Comparative Example | | | | | | | | |
|---|---|---|---|---|---|---|---|---|---|---|
|  |  | 15 | 16 | 17 | 18 | 19 | 20 | 21 | 22 | 23 |
| Thermoplastic resin (A) | A4 | 100 | 100 | 100 | 100 | 100 | 100 | 100 | 100 | 100 |
| Metal salt-containing flame retardant (B) | B1 | 0.08 | 0.08 | 0.08 | 0.08 | 0.10 | 0.10 | 0.22 | 0.22 |  |
|  | B2 |  |  |  |  |  |  |  |  |  |
|  | B3 |  |  |  |  |  |  |  |  | 0.25 |
| Butadiene-containing elastomer | J1 | 2.06 |  |  |  |  |  | 2.06 | 2.06 | 2.06 |
|  | J2 |  | 2.06 |  |  |  |  |  |  |  |
|  | J3 |  |  | 2.06 |  |  |  |  |  |  |
|  | J4 |  |  |  | 2.06 |  |  |  |  |  |
| Silicone-containing elastomer | J5 |  |  |  |  | 2.06 |  |  |  |  |
|  | J6 |  |  |  |  |  | 2.06 |  |  |  |
| Polyorganosiloxane | C1 |  |  |  |  |  |  | 0.10 | 0.10 | 0.10 |
| Fluorinated resin | H2 | 0.31 | 0.31 | 0.31 | 0.31 | 0.31 | 0.31 | 0.31 |  | 0.31 |
|  | H3 |  |  |  |  |  |  |  |  |  |
| Stabilizer | E1 | 0.05 | 0.05 | 0.05 | 0.05 | 0.05 | 0.05 | 0.05 | 0.05 | 0.05 |
|  | E2 | 0.10 | 0.10 | 0.10 | 0.10 | 0.10 | 0.10 | 0.10 | 0.10 | 0.10 |
| Release agent | F1 | 0.08 | 0.08 | 0.08 | 0.08 | 0.08 | 0.08 | 0.08 | 0.08 | 0.08 |
|  | F2 | 0.08 | 0.08 | 0.08 | 0.08 | 0.08 | 0.08 | 0.08 | 0.08 | 0.08 |
| UV absorber | D1 | 0.31 | 0.31 | 0.31 | 0.31 | 0.31 | 0.31 | 0.31 | 0.31 | 0.31 |
| Q value | $\times 10^{-2}$ cc/sec | 5.8 | 5.8 | 5.7 | 5.8 | 5.8 | 5.8 | 5.8 | 5.8 | 5.8 |
| Notched Charpy | 23° C. kJ/m$^2$ | 70 | 71 | 70 | 73 | 63 | 70 | 71 | 71 | 72 |
| impact strength | −30° C. kJ/m$^2$ | 48 | 27 | 28 | 27 | 21 | 26 | 47 | 46 | 47 |
| Combustibility | 1.5 mm V-0 | V-0 | V-0 | V-0 | V-0 | V-0 | V-1 | V-1 | V-2 | V-1 |
|  | 3 mm 5VB | 5VB | 5VB | 5VB | 5VB | 5VB | — | — | — | — |
|  | 3 mm 5VA | 5VA | 5VA | 5VA | 5VA | 5VA | — | — | — | — |
| Flammability following exposure to water | 1.5 mm V-0 | V-1 | V-1 | V-1 | V-1 | V-1 | — | — | — | — |

Examples 32 to 38 and Comparative Examples 24 and 25

Pellets of polycarbonate resin compositions were obtained and evaluated in the same way as in Example 24, except that the components shown in Tables 1 and 2 above were blended at the proportions (mass ratios) shown in Table 12 below.

TABLE 12

| | | Example | | | | | | | Comp. Example | |
|---|---|---|---|---|---|---|---|---|---|---|
| | | 32 | 33 | 34 | 35 | 36 | 37 | 38 | 24 | 25 |
| Thermoplastic resin (A) | A4 | 100 | 100 | 100 | 100 | 100 | 100 | 100 | 100 | 100 |
| Metal salt-containing flame retardant (B) | B1 | 0.08 | 0.08 | 0.08 | 0.06 | 0.08 | 0.08 | 0.08 | 0.08 | 0.08 |
| Butadiene-containing elastomer | J1 | 2.06 | 2.07 | 2.07 | 2.06 | 2.07 | 2.06 | 2.07 | 2.06 | 2.06 |
| Polyorganosiloxane | C1 | 0.10 | 0.31 | 0.52 | | | | | | |
| | C2 | | | | 0.10 | 0.31 | | | | |
| | C3 | | | | | | 0.10 | 0.31 | | |
| | CX1 | | | | | | | | 0.10 | |
| | CX2 | | | | | | | | | 0.10 |
| Fluorinated resin | H2 | 0.31 | 0.31 | 0.31 | 0.31 | 0.31 | 0.31 | 0.31 | 0.31 | 0.31 |
| Stabilizer | E1 | 0.05 | 0.05 | 0.05 | 0.05 | 0.05 | 0.05 | 0.05 | 0.05 | 0.05 |
| | E2 | 0.10 | 0.10 | 0.10 | 0.10 | 0.10 | 0.10 | 0.10 | 0.10 | 0.10 |
| Release agent | F1 | 0.08 | 0.08 | 0.08 | 0.08 | 0.08 | 0.08 | 0.08 | 0.08 | 0.08 |
| | F2 | 0.08 | 0.08 | 0.08 | 0.08 | 0.08 | 0.08 | 0.08 | 0.08 | 0.08 |
| UV absorber | D1 | 0.31 | 0.31 | 0.31 | 0.31 | 0.31 | 0.31 | 0.31 | 0.31 | 0.31 |
| Q value | ×10$^{-2}$ cc/sec | 5.8 | 5.9 | 5.9 | 5.8 | 5.8 | 5.8 | 5.9 | 5.8 | 5.8 |
| Notched Charpy impact strength | 23° C. kJ/m$^2$ | 72 | 70 | 69 | 72 | 70 | 70 | 70 | 70 | 70 |
| | −30° C. kJ/m$^2$ | 47 | 43 | 43 | 46 | 43 | 43 | 41 | 45 | 45 |
| Combustibility | 1.5 mm V-0 | V-0 | V-0 | V-0 | V-0 | V-0 | V-0 | V-0 | V-0 | V-0 |
| | 3 mm 5VB | 5VB | 5VB | 5VB | 5VB | 5VB | 5VB | 5VB | 5VB | 5VB |
| | 3 mm 5VA | 5VA | 5VA | 5VA | 5VA | 5VA | 5VA | 5VA | 5VA | 5VA |
| Flammability following exposure to water | 1.5 mm V-0 | V-0 | V-0 | V-0 | V-0 | V-0 | V-0 | V-0 | V-1 | V-1 |

Examples 39 to 42 and Comparative Examples 26 and 27

Pellets of polycarbonate resin compositions were obtained and evaluated in the same way as in Example 1, except that the components shown in Tables 1 and 2 above were blended at the proportions (mass ratios) shown in Table 13 below.

TABLE 13

| | | Example | | | | Com. Example | |
|---|---|---|---|---|---|---|---|
| | | 39 | 40 | 41 | 42 | 26 | 27 |
| Thermoplastic resin (A) | A1 | | | 30 | 30 | 30 | 30 |
| | A2 | 75 | 75 | 45 | 45 | 45 | 45 |
| | A3 | | | | | | |
| | A4 | | | | | | |
| | A5 | 25 | 25 | 25 | 25 | 25 | 25 |
| | A6 | | | | | | |
| | A7 | | | | | | |
| | A8 | | | | | | |
| Polyorganosiloxane | C1 | | | | | | |
| | C2 | | | | | | |
| | C3 | 0.5 | 1 | 0.5 | 1 | 0.01 | 5 |
| | CX1 | | | | | | |
| | CX2 | | | | | | |
| Metal salt-containing flame retardant (B) | B1 | 0.05 | 0.05 | 0.05 | 0.05 | 0.05 | 0.05 |
| UV absorber | D1 | 0.3 | 0.3 | 0.3 | 0.3 | 0.3 | 0.3 |
| Stabilizer | E1 | 0.03 | 0.03 | 0.03 | 0.03 | 0.03 | 0.03 |
| Release agent | F1 | 0.1 | 0.1 | 0.1 | 0.1 | 0.1 | 0.1 |
| | F2 | 0.1 | 0.1 | 0.1 | 0.1 | 0.1 | 0.1 |
| Haze (3 mmt) | | 0.4 | 0.4 | 0.4 | 0.4 | 0.4 | Extrusion not possible |
| Residence moldability | | A | A | A | A | A | |
| Flame retardancy (1.0 mmt) | | V-0 | V-0 | V-0 | V-0 | V-0 | V-2 |

Examples 44 to 47 and Comparative Examples 28 to 31

Pellets of polycarbonate resin compositions were obtained in the same way as in Example 1, except that the components shown in Tables 1 and 2 above were blended at the proportions (mass ratios) shown in Table 14 below, and evaluated in terms of haze and residence stability in the same way as in Example 1. In addition, these pellets were evaluated in terms of flame retardancy (UL-94) in the same way as in Example 1, except that the sample thickness was 0.8 mm.

<Pencil hardness>

The obtained pellets were dried for 4 hours at 120° C., a two-step plate measuring 111 mm×36 mm and including parts having thicknesses of 2 mm and 3 mm was formed using an injection molding machine (SE-50DUZ produced by Sumitomo Heavy Industries, Ltd.) at a cylinder temperature of 300° C. and a die temperature of 80° C., and the pencil hardness of the 3 mm thick part of the two step plate was measured using a pencil hardness tester (produced by Toyo Seiki Seisaku-sho, Ltd.) at a load of 750 g in accordance with ISO 15184.

TABLE 14

|  |  | Example | | | | Comp. Example | | | |
|---|---|---|---|---|---|---|---|---|---|
|  |  | 44 | 45 | 46 | 47 | 28 | 29 | 30 | 31 |
| Thermoplastic resin (A) | A1 |  |  |  |  |  |  |  |  |
|  | A2 | 45 | 45 | 42.5 | 42.5 | 42.5 | 42.5 | 42.5 | 42.5 |
|  | A3 |  |  |  |  |  |  |  |  |
|  | A4 |  |  |  |  |  |  |  |  |
|  | A5 | 25 | 25 | 22.5 | 22.5 | 22.2 | 22.5 | 22.5 | 22.5 |
|  | A6 |  |  |  |  |  |  |  |  |
|  | A7 |  |  |  |  |  |  |  |  |
|  | A8 | 30 | 30 | 35 | 35 | 35 | 35 | 35 | 35 |
| Polyorganosiloxane | C1 |  |  |  |  |  |  |  |  |
|  | C2 |  |  |  |  |  |  |  |  |
|  | C3 | 0.5 | 1 | 0.5 | 1 |  | 0.01 | 5 |  |
|  | CX1 |  |  |  |  |  |  |  |  |
|  | CX2 |  |  |  |  |  |  |  | 1 |
| Metal salt-containing flame retardant (B) | B1 | 0.1 | 0.1 | 0.1 | 0.1 | 0.1 | 0.1 | 0.1 | 0.1 |
| UV absorber | D1 | 0.3 | 0.3 | 0.3 | 0.3 | 0.3 | 0.3 | 0.3 | 0.3 |
| Stabilizer | E1 | 0.03 | 0.03 | 0.03 | 0.03 | 0.03 | 0.03 | 0.03 | 0.03 |
| Release agent | F1 | 0.1 | 0.1 | 0.1 | 0.1 | 0.1 | 0.1 | 0.1 | 0.1 |
|  | F2 | 0.1 | 0.1 | 0.1 | 0.1 | 0.1 | 0.1 | 0.1 | 0.1 |
| Haze (3 mmt) |  | 0.4 | 0.4 | 0.4 | 0.4 | 0.4 | 0.4 | Extrusion not possible | 4 |
| Residence moldability |  | A | A | A | A | A | A |  | C |
| Flame retardancy (0.8 mmt) |  | V-0 | V-0 | V-0 | V-0 | V-2 | V-2 |  | V-2 |
| Pencil hardness |  | HB | HB | F | F | F | F |  | F |

Example 48

Pellets of a polycarbonate resin composition were obtained in the same way as in Example 1, except that the composition did not contain a metal salt-containing flame retardant, and evaluated in terms of haze (3 mmt) and residence moldability. The haze value was 0.4, and the residence moldability was A.

INDUSTRIAL APPLICABILITY

The thermoplastic resin composition of the present invention is a thermoplastic resin material which exhibits excellent flame retardancy and excellent residence moldability when molded, and can therefore be broadly and advantageously used in components of electrical/electronic equipment, office automation equipment, information terminals, domestic appliances, lighting devices, and the like, and exhibits extremely high industrial applicability.

The invention claimed is:

1. A thermoplastic resin composition, comprising:
   a thermoplastic resin (A); and, per 100 parts by mass of the thermoplastic resin (A), from 0 to 0.2 parts by mass of a metal salt-comprising flame retardant (B), and not less than 0.05 parts by mass and less than 2 parts by mass of an organopolysiloxane (C),
   wherein the organopolysiloxane (C) has a molecular weight distribution (Mw/Mn) in a range of from 1.01 to 1.25, and satisfies formula (1) and $0 \leq D/(T+Q) \leq 0.4$ $$(R^1R^2R^3SiO_{2/2})_M(R^4R^5SiO_{2/2})_D(R^6SiO_{3/2})_T(SiO_{4/2})_Q (O_{1/2}R^7)_{E1}(O_{1/2}H)_{E2} \quad (1),$$

wherein
$R^1$ to $R^6$ are independently an organic functional group or H,
$R^7$ is an organic group,
M, D, T and Q are independently a number that is not less than 0 and less than 1 and satisfies $M+D+T+Q=1$,
$E1 \geq 0$,
$E2 \geq 0$, and
$0 < E1+E2 \leq 4$,
wherein the thermoplastic resin (A) is a pMlycarbonate resin, which contains 20% by mass or more of a polycarbonate resin with a structural viscosity index N of 1.2 to 1.8, or which contains 10% by mass or more of a polycarbonate resin having a viscosity average molecular weight [Mv] of 50.000 to 95.000, and
wherein the thermoplastic resin composition has a UL-94 rating of V-0 at a thickness of 1.5 millimeter.

2. The composition of claim 1, comprising, per 100 parts by mass of the thermoplastic resin (A), from 0.01 to 0.2 parts by mass of the metal salt-comprising flame retardant (B).

3. The composition of claim 1, wherein the metal salt-comprising flame retardant (B) is an alkali metal salt of an organic sulfonic acid.

4. The composition of claim 3, wherein the alkali metal salt of the organic sulfonic acid is an alkali metal salt of a perfluoroalkane sulfonic acid.

5. The composition of claim 4, wherein the alkali metal salt of the perfluoroalkane sulfonic acid is a potassium nonafluorobutane sulfonate and/or a potassium trifluoromethane sulfonate.

6. The composition of claim 1, wherein a main chain of the organopolysiloxane (C) has a branched structure.

7. The composition of claim 1, wherein the organopolysiloxane (C) comprises an organooxy group in a range of from 0.01 to 10 mol %, relative to a total organic functional group amount.

8. The composition of claim 1, wherein the organopolysiloxane (C) comprises an organooxy group in a range of from 0.01 to 5 mol %, relative to a total organic functional group amount.

9. The composition of claim 1, wherein a weight average molecular weight of the organopolysiloxane (C) is in a range of from 500 to 2,000.

10. The composition of claim 1, further comprising:
a fluorinated resin.

11. The composition of claim 1, further comprising:
a light-diffusing agent.

12. The composition of claim 11, wherein the light-diffusing agent comprises a spherical particle comprising a methylsilsesquioxane and/or an acrylic resin.

13. The composition of claim 1, further comprising:
an elastomer.

14. The composition of claim 13, wherein the elastomer is a core/shell type elastomer comprising a butadienic rubber as a core and a content of the elastomer is in a range of from 0.5 to 5 parts by mass per 100 parts by mass of the thermoplastic resin (A).

15. A molded article, comprising:
the composition of claim 1.

16. The composition of claim 1, wherein
the metal salt comprising flame retardant (B) is an organic alkali metal salt compound, in an amount of 0.01 to 0.2 parts by mass relative to 100 parts by mass of the thermoplastic resin (A).

17. The composition of claim 1, wherein the organopolysiloxane (C) has a molecular weight distribution (Mw/Mn) of 1.2 or less.

* * * * *